US012607830B2

(12) United States Patent
Miao et al.

(10) Patent No.: US 12,607,830 B2
(45) Date of Patent: Apr. 21, 2026

(54) CAMERA OPTICAL LENS

(71) Applicant: AAC Optics (Suzhou) Co., Ltd.,
Suzhou (CN)

(72) Inventors: Lili Miao, Suzhou (CN); Shunda Zhou, Suzhou (CN)

(73) Assignee: AAC Optics (Suzhou) Co., Ltd.,
Suzhou (CN)

( * ) Notice: Subject to any disclaimer, the term of this patent is extended or adjusted under 35 U.S.C. 154(b) by 319 days.

(21) Appl. No.: 18/398,221

(22) Filed: Dec. 28, 2023

(65) Prior Publication Data

US 2025/0004249 A1     Jan. 2, 2025

(30) Foreign Application Priority Data

Jun. 28, 2023     (CN) .......................... 202310772363.6

(51) Int. Cl.
*G02B 13/00*        (2006.01)
*G02B 9/64*         (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS 11,314,059 B2 * 4/2022 Bian ................... G02B 13/0045
11,474,329 B2 * 10/2022 Yan ......................... G02B 7/021
11,506,868 B2 * 11/2022 Fan .......................... G02B 9/64

* cited by examiner

*Primary Examiner* — Lucy P Chien
(74) *Attorney, Agent, or Firm* — Wiersch Law Group

(57)                    ABSTRACT

The present application relates to the field of optical lenses and discloses a camera optical lens, including, in order from an objective side to an image side: a first lens, a second lens, a third lens, a fourth lens, a fifth lens, a sixth lens, and a seventh lens. The following relationship expressions are satisfied: $1.70 \leq n1 \leq 2.20$; $0.80 \leq f5/f \leq 1.40$; $0.70 \leq d3/d5 \leq 2.80$. The present application provides a wide-angle optical camera lens with a large aperture having excellent optical performance.

15 Claims, 15 Drawing Sheets

20

Axial Aberration

Magnification Chromatic Aberration

30

Axial Aberration

40

Axial Aberration

Magnification Chromatic Aberration

60

Axial Aberration

Millimeter

Magnification Chromatic Aberration

Micron

70

CAMERA OPTICAL LENS

TECHNICAL FIELD

The present application relates to the field of optical lenses, in particular to a camera optical lens applicable to handheld terminal devices such as smartphones and digital cameras, as well as camera devices such as monitors, PC lenses, and in-vehicle camera lenses.

BACKGROUND

In recent years, with the rise of smartphones, the demand for compact camera lenses has been increasing. Typically, camera lenses use photosensitive devices, either Charge Coupled Devices (CCD) or Complementary Metal-Oxide Semiconductor Sensors (CMOS Sensors). Due to the advancement in semiconductor manufacturing technology, the pixel size of imaging devices has been reduced. Additionally, the current trend in electronic products is toward compact and lightweight designs with enhanced functionality. Consequently, small-sized camera lenses with excellent imaging quality have become the mainstream in the current market. To achieve optimal imaging quality, conventional lenses used in smartphone cameras often adopt a three-lens or four-lens structure. Furthermore, with technological advancements and an increase in diverse user demands, along with the continual reduction in pixel size of imaging devices and the escalating requirements for image quality in systems, a seven-lens structure has gradually emerged in lens design. There is an urgent need for a wide-angle camera optical lens with excellent optical characteristics and ultra-thinness.

SUMMARY

In response to the above problem, an object of the present application is to provide a camera optical lens having a large aperture with excellent optical performance and wide-angle optical performance.

In order to solve the above technical problems, the present application proposes a camera optical lens, comprising, in order from an objective side to an image side:
a first lens having a negative refractive force;
a second lens having a positive refractive force;
a third lens having a positive refractive force;
a fourth lens having a negative refractive force;
a fifth lens having a positive refractive force;
a sixth lens having a negative refractive force; and
a seventh lens having a positive refractive force;
wherein it is defined that a refractive index of the first lens n1, a focal length of the fifth lens is f5, a focal length of the camera optical lens is f, an on-axis thickness of the second lens is d3, and an on-axis thickness of the third lens is d5; and the following relationship expressions are satisfied:

$$1.70 \leqq n1 \leqq 2.20;$$

$$0.80 \leqq f5/f \leqq 1.40;$$

$$0.70 \leqq d3/d5 \leqq 2.80.$$

In one embodiment, a central radius of curvature of an objective surface of the fourth lens is R7; a central radius of curvature of an image surface of the fourth lens is R8, and the following relationship expression is satisfied:

$$2.00 \leq (R7 + R8)/(R7 - R8) \leq 4.00.$$

In one embodiment, an on-axis distance from an image surface of the sixth lens to an objective surface of the seventh lens is d12; an on-axis thickness of the sixth lens is d11, and the following relationship expression is satisfied:

$$1.30 \leq d12/d11 \leq 5.00.$$

In one embodiment, a focal length of the seventh lens is f7, and the following relationship expression is satisfied:

$$20.00 \leq f7/f \leq 80.00.$$

In one embodiment, an objective surface of the first lens is convex at a proximal-axis position, and an image surface of the first lens is concave at a proximal-axis position;
a focal length of the first lens is f1; a central radius of curvature of the objective surface of the first lens is R1; a central radius of curvature of the image surface of the first lens is R2; an on-axis thickness of the first lens is d1; a total track length of the camera optical lens is TTL, and the following relationship expressions are satisfied:

$$-3.11 \leq f1/f \leq -0.85;$$

$$0.77 \leq (R1 + R2)/(R1 - R2) \leq 4.36;$$

$$0.02 \leq d1/TTL \leq 0.20.$$

In one embodiment, the camera optical lens satisfies the following relationship expressions:

$$-1.94 \leq f1/f \leq -1.06;$$

$$1.23 \leq (R1 + R2)/(R1 - R2) \leq 3.49;$$

$$0.03 \leq d1/TTL \leq 0.16.$$

In one embodiment, an image surface of the second lens is convex at a proximal-axis position;
a focal length of the second lens is f2; a central radius of curvature of an objective surface of the second lens is R3; a central radius of curvature of the image surface of the second lens is R4; a total track length of the camera optical lens is TTL, and the following relationship expressions are satisfied:

$$1.75 \leq f2/f \leq 7.08;$$

$$0.35 \leq (R3 + R4)/(R3 - R4) \leq 1.85;$$

$$0.02 \leq d3/TTL \leq 0.17.$$

In one embodiment, the camera optical lens satisfies the following relationship expressions:

$$2.80 \le f2/f \le 5.66;$$

$$0.56 \le (R3 + R4)/(R3 - R4) \le 1.48;$$

$$0.03 \le d3/TTL \le 0.14.$$

In one embodiment, an objective surface of the third lens is convex at a proximal-axis position;
a focal length of the third lens is f3; a central radius of curvature of the objective surface of the third lens is R5; a central radius of curvature of an image surface of the third lens is R6; a total track length of the camera optical lens is TTL, and the following relationship expressions are satisfied:

$$0.96 \le f3/f \le 4.57;$$

$$-2.07 \le (R5 + R6)/(R5 - R6) \le -0.67;$$

$$0.02 \le d5/TTL \le 0.08.$$

In one embodiment, the camera optical lens satisfies the following relationship expressions:

$$1.54 \le f3/f \le 3.65;$$

$$-1.29 \le (R5 + R6)/(R5 - R6) \le -0.83;$$

$$0.03 \le d5/TTL \le 0.06.$$

In one embodiment, an objective surface of the fourth lens is convex at a proximal-axis position and an image surface of the fourth lens is concave at a proximal-axis position;
a focal length of the fourth lens is f4; an on-axis thickness of the fourth lens is d7; a total track length of the camera optical lens is TTL, and the following relationship expressions are satisfied:

$$-9.49 \le f4/f \le -1.67;$$

$$0.01 \le d7/TTL \le 0.05.$$

In one embodiment, the camera optical lens satisfies the following relationship expressions:

$$-5.93 \le f4/f \le -2.09;$$

$$0.02 \le d7/TTL \le 0.04.$$

In one embodiment, an objective surface of the fifth lens is convex at a proximal-axis position, and an image surface of the fifth lens is convex at a proximal-axis position;
a central radius of curvature of the objective surface of the fifth lens is R9; a central radius of curvature of the image surface of the fifth lens is R10; an on-axis thickness of the fifth lens is d9; a total track length of the camera optical lens is TTL, and the following relationship expressions are satisfied:

$$0.04 \le (R9 + R10)/(R9 - R10) \le 0.40;$$

$$0.04 \le d9/TTL \le 0.19.$$

In one embodiment, the camera optical lens satisfies the following relationship expressions:

$$0.06 \le (R9 + R10)/(R9 - R10) \le 0.32;$$

$$0.06 \le d9/TTL \le 0.15.$$

In one embodiment, an objective surface of the sixth lens is convex at a proximal-axis position, and an image surface of the sixth lens is concave at a proximal-axis position;
a focal length of the sixth lens is f6; a central radius of curvature of the objective surface of the sixth lens is R11; a central radius of curvature of the image surface of the sixth lens is R12; an on-axis thickness of the sixth lens is d11; a total track length of the camera optical lens is TTL, and the following relationship expressions are satisfied:

$$-8.36 \le f6/f \le -1.42;$$

$$1.29 \le (R11 + R12)/(R11 - R12) \le 8.65;$$

$$0.01 \le d11/TTL \le 0.06.$$

In one embodiment, the camera optical lens satisfies the following relationship expressions:

$$-5.22 \le f6/f \le -1.78;$$

$$2.07 \le (R11 + R12)/(R11 - R12) \le 6.92;$$

$$0.02 \le d11/TTL \le 0.05.$$

In one embodiment, an objective surface of the seventh lens is convex at a proximal-axis position, and an image surface of the seventh lens is concave at a proximal-axis position;
a central radius of curvature of the objective surface of the seventh lens is R13; a central radius of curvature of the image surface of the seventh lens is R14; an on-axis thickness of the seventh lens is d13; a total track length of the camera optical lens is TTL and the following relationship expressions are satisfied:

$$7.44 \le (R13 + R14)/(R13 - R14) \le 84.93;$$

$$0.04 \le d13/TTL \le 0.21.$$

In one embodiment, the camera optical lens satisfies the following relationship expressions:

$$11.90 \le (R13 + R14)/(R13 - R14) \le 67.95;$$

$$0.06 \le d13/TTL \le 0.17.$$

5 6

In one embodiment, a total track length (TTL) of the camera optical lens is less than or equal to 9.03 mm.

In one embodiment, the total track length (TTL) of the camera optical lens is less than or equal to 8.62 mm.

In one embodiment, an aperture value FNO of the camera optical lens is less than or equal to 2.27.

In one embodiment, the aperture value FNO of the camera optical lens is less than or equal to 2.22.

In one embodiment, a field of view (FOV) of the camera optical lens is greater than or equal to 93°.

In one embodiment, the first lens is made of glass material.

In one embodiment, the fifth lens is made of glass material.

The beneficial effect of the present application is that the camera optical lens according to the present application has a large aperture with excellent optical performance as well as wide-angle optical performance, which is particularly suitable for smartphone camera lens assemblies, WEB camera lenses, and vehicle camera lenses consisting of high-pixel camera elements such as CCD, CMOS and the like.

DETAILED DESCRIPTION OF THE EMBODIMENTS

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

First Embodiment

Figure 1:
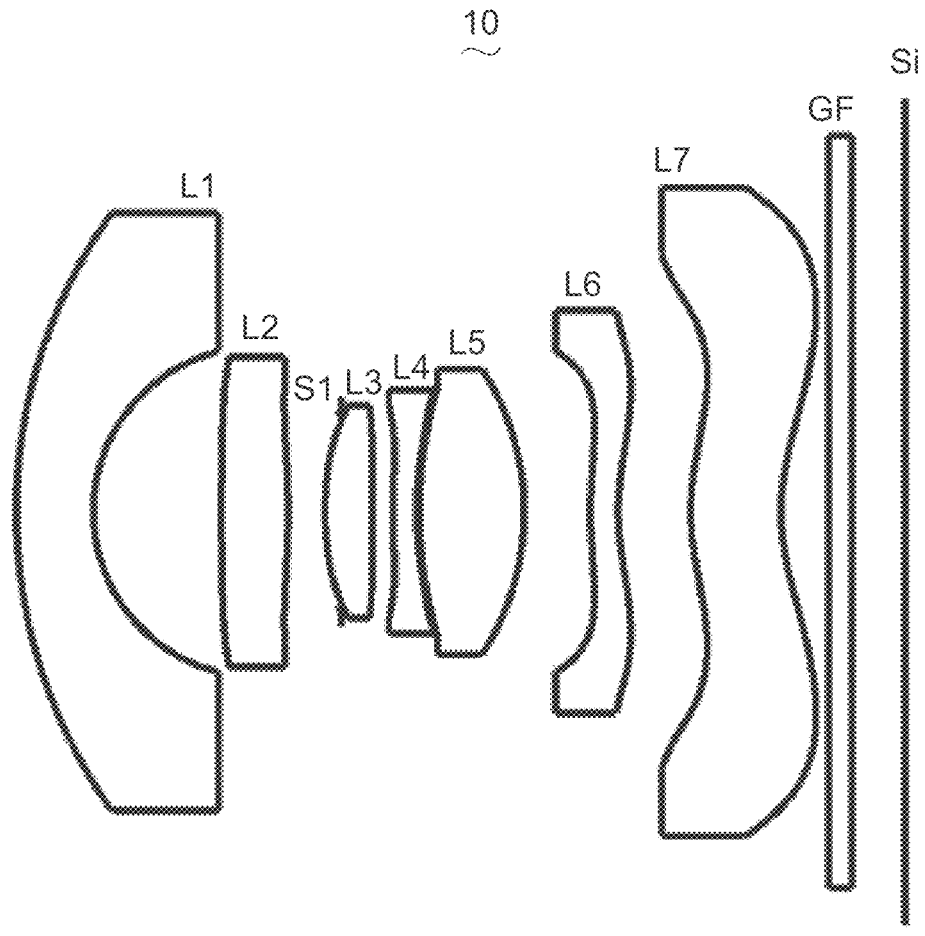
FIG. 1 is a structural schematic diagram of a camera optical lens according to the first embodiment of the present application.

As shown in the accompanying drawings, the present application provides a camera optical lens 10. FIG. 1 shows a camera optical lens 10 according to the first embodiment of the present application, and the camera optical lens 10 includes seven lenses. Specifically, the camera optical lens 10, in order from an objective side to an image side, includes a first lens L1, a second lens L2, an aperture S1, a third lens L3, a fourth lens L4, a fifth lens L5, a sixth lens L6, a seventh lens L7, and an image surface Si. An optical element such as an optical filter GF may be provided between the seventh lens L7 and the image surface Si.

In this embodiment, the first lens L1 is made of glass material, the second lens L2 is made of plastic material, the third lens L3 is made of plastic material, the fourth lens L4 is made of plastic material, the fifth lens L5 is made of glass material, the sixth lens L6 is made of plastic material, and the seventh lens L7 is made of plastic material. This helps to improve system performance and system stability. In other embodiments, the respective lenses may also be made of other materials.

It is defined that a refractive index of the first lens L1 is n1, and the following relationship expression is satisfied: $1.70 \leq n1 \leq 2.20$. The camera optical lens 10 prioritizes high refractive index materials, which is conducive to front-end aperture reduction and the enhancement of imaging quality.

It is defined that a focal length of the fifth lens L5 is f5, and a focal length of the camera optical lens 10 is f. The following relationship expression is satisfied: $0.80 \leq f5/f \leq 1.40$. The value of the focal length of the single lens is controlled to reasonably distribute the focal length, which is conducive to controlling temperature fluttering and obtaining good temperature performance.

An on-axis thickness of the second lens L2 is d3, and an on-axis thickness of the third lens L3 is d5. The following relationship expression is satisfied: $0.70 = d3/d5 \leq 2.80$. the thickness of the lenses is reasonably controlled, which is conducive to molding and assembly.

It is defined that a central radius of curvature of an objective surface of the fourth lens L4 is R7, and a central radius of curvature of an image surface of the fourth lens L4 is R8. The following relationship expression is satisfied: $2.00 \leq (R7+R8)/(R7-R8) \leq 4.00$, in which the shape of the fourth lens is specified, which can effectively balance the amount of field curvature of the system, so that the amount of field curvature offset in the center field of view is less than 0.01 mm.

It is defined that an on-axis distance from an image surface of the sixth lens L6 to an objective surface of the seventh lens L7 is d12, and an on-axis thickness of the sixth lens L6 is d11. The following relationship expression is satisfied: $1.30 \leq d12/d11 \leq 5.00$, and it helps to compress the total length of the optical system within the range of the relationship expression.

It is defined that a focal length of the seventh lens L7 is f7, and the following relationship expression is satisfied: $20.00 \leq f7/f \leq 80.00$, in which a ratio between the last lens and the total focal length of the system is specified. Within the range of the relationship expression, the degree of light bias through the lens can be moderated and the chromatic aberration can be efficiently corrected, so that the chromatic aberration $|LC| \leq 6.0$ μm.

In this embodiment, the objective surface of the first lens L1 is convex at a proximal-axis position, an image surface of the first lens L1 is concave at a proximal-axis position, and the first lens L1 has a negative refractive force. In other embodiments, the objective surface and image surface of the first lens L1 may also be set to other concave and convex distributions.

It is defined that a focal length of the integral camera optical lens 10 is f, and a focal length of the first lens L1 is f1. The following relationship expression is satisfied: $-3.11 \leq f1/f \leq -0.85$, in which a ratio of the focal length of the first lens L1 to the integral focal length is specified. Within the specified range, the first lens has an appropriate negative refractive force, which is conducive to the reduction of systematic aberration and development of the lens toward ultra-thinness and wide-angle. In an embodiment, $-1.94 \leq f1/f \leq -1.06$ is satisfied.

A central radius of curvature of the objective surface of the first lens L1 is R1, and a central radius of curvature of the image surface of the first lens L1 is R2. The following relationship expression is satisfied: $0.77 \leq (R1+R2)/(R1-R2)$ $\leq 4.36$. By reasonably controlling the shape of the first lens, the first lens is able to efficiently correct the system's spherical aberration. In an embodiment, $1.23 \leq (R1+R2)/(R1-R2) \leq 3.49$ is satisfied.

An on-axis thickness of the first lens L1 is d1, and a total track length of the camera optical lens 10 is TTL. The following relationship expression is satisfied: $0.02 \leq d1/TTL \leq 0.20$, which is conducive to realizing ultra-thinness. In an embodiment, $0.03 \leq d1/TTL \leq 0.16$ is satisfied.

In this embodiment, an objective surface of the second lens L2 is convex at a proximal-axis position, an image surface thereof is convex at a proximal-axis position, and the second lens L2 has a positive refractive force. In other embodiments, the objective surface and image surface of the second lens L2 may also be set to other concave and convex distributions.

It is defined that a focal length of the integral camera optical lens 10 is f, and a focal length of the second lens L2 is f2. The following relationship expression is satisfied: $1.75 \leq f2/f \leq 7.08$, in which a ratio of the focal length of the second lens L2 to the integral focal length is specified. Within the specified range, the second lens L2 has an appropriate positive refractive force, which is conducive to correcting the aberration of the optical system. In an embodiment, $2.80 \leq f2/f \leq 5.66$ is satisfied.

A central radius of curvature of the objective surface of the second lens L2 is R3, and a central radius of curvature of the image surface of the second lens L2 is R4. The following relationship expression is satisfied: $0.35 \leq (R3+R4)/(R3-R4) \leq 1.85$, in which the shape of the second lens L2 is specified. Within the specified range, it is conducive to compensating for the on-axis aberration with the development of the lens towards ultra-thinness and wide-angle. In an embodiment, $0.56 \leq (R3+R4)/(R3-R4) \leq 1.48$ is satisfied.

An on-axis thickness of the second lens L2 is d3, and the total track length of the camera optical lens 10 is TTL. The following relationship expression is satisfied: $0.02 \leq d3/TTL \leq 0.17$, in which a ratio of the on-axis thickness of the second lens L2 to the total track length TTL of the camera optical lens 10 is specified, which is conducive to realizing ultra-thinness. In an embodiment, $0.03 \leq d3/TTL \leq 0.14$ is satisfied.

In this embodiment, an objective surface of the third lens L3 is convex at a proximal-axis position, an image surface thereof is concave at a proximal-axis position, and the third lens L3 has a positive refractive force. In other embodiments, the objective surface and image surface of the third lens L3 may also be set to other concave and convex distributions.

It is defined that the focal length of the integral camera optical lens 10 is f, and a focal length of the third lens L3 is f3. The following relationship expression is satisfied: $0.96 \leq f3/f \leq 4.57$, in which a ratio of the focal length of the third lens L3 to the overall focal length is specified. Within the specified range, the third lens L3 has an appropriate positive refractive force, which enables the system to have better imaging quality and lower sensitivity through the reasonable distribution of optical focal length. In an embodiment, $1.54 \leq f3/f \leq 3.65$ is satisfied.

A central radius of curvature of the objective surface of the third lens L3 is R5, and a central radius of curvature of the image surface of the third lens L3 is R6. The following relationship expression is satisfied: $-2.07 \leq (R5+R6)/(R5-R6) \leq -0.67$. The shape of the third lens L3 can be effectively controlled, which is conducive to the shaping of the third lens L3 and avoids poor shaping and stress generation due to the excessive surface curvature of the third lens L3. In an embodiment, $-1.29 \le (R5+R6)/(R5-R6) \le -0.83$ is satisfied.

An on-axis thickness of the third lens L3 is d5, and the total track length of the camera optical lens 10 is TTL. The following relationship expression is satisfied: $0.02 \le d5/TTL \le 0.08$, which is conducive to realizing ultra-thinness. In an embodiment, $0.03 \le d5/TTL \le 0.06$ is satisfied.

In this embodiment, an objective surface of the fourth lens L4 is convex at a proximal-axis position, an image surface thereof is concave at a proximal-axis position, and the fourth lens L4 has a negative refractive force. In other embodiments, the objective surface and image surface of the fourth lens L4 may also be set to other concave and convex distributions.

It is defined that the focal length of the integral camera optical lens 10 is f, and a focal length of the fourth lens L4 is f4. The following relationship expression is satisfied: $-9.49 \le f4/f \le -1.67$, in which a ratio of the focal length of the fourth lens L4 to the overall focal length is specified. Within the specified range, the fourth lens L4 has an appropriate negative refractive force, which enables the system to have better imaging quality and lower sensitivity through the reasonable distribution of optical focal length. In an embodiment, $-5.93 \le f4/f \le -2.09$ is satisfied.

An on-axis thickness of the fourth lens L4 is d7, and the total track length of the camera optical lens 10 is TTL. The following relationship expression is satisfied: $0.01 \le d7/TTL \le 0.05$, in which a ratio of the on-axis thickness of the fourth lens L4 to the total track length TTL of the camera optical lens 10 is specified, which is conducive to realizing ultra-thinness. In an embodiment, $0.02 \le d7/TTL \le 0.04$ is satisfied.

In this embodiment, an objective surface of the fifth lens L5 is convex at a proximal-axis position, an image surface thereof is convex at a proximal-axis position, and the fifth lens L5 has a positive refractive force. In other embodiments, the objective surface and the image surface of the fifth lens L5 may also be set to other concave and convex distributions.

A central radius of curvature of the objective surface of the fifth lens L5 is R9, and a central radius of curvature of the image surface of the fifth lens L5 is R10. The following relationship expression is satisfied: $0.04 \le (R9+R10)/(R9-R10) \le 0.40$, in which the shape of the fifth lens L5 is specified. Within this specified range, it is conducive to compensating for aberration of the off-axis drawing angle and other problems with the development toward ultra-thinness and wide-angle. In an embodiment, $0.06 \le (R9+R10)/(R9-R10) \le 0.32$ is satisfied.

An on-axis thickness of the fifth lens L5 is d9, and the total track length of the camera optical lens 10 is TTL. The following relationship expression is satisfied: $0.04 \le d9/TTL \le 0.19$, which is conducive to realizing ultra-thinness. In an embodiment, $0.06 \le d9/TTL \le 0.15$ is satisfied.

In this embodiment, an objective surface of the sixth lens L6 is convex at a proximal-axis position, an image surface thereof is concave at a proximal-axis position, and the sixth lens L6 has a negative refractive force. In other embodiments, the objective surface and image surface of the sixth lens L6 may also be set to other concave and convex distributions.

It is defined that the focal length of the integral camera optical lens 10 is f, and a focal length of the sixth lens L6 is f6. The following relationship expression is satisfied: $-8.36 \le f6/f \le -1.42$, in which a ratio of the focal length of the sixth lens L6 to the overall focal length is specified. Within the specified range, the sixth lens L6 has an appropriate negative refractive force, which enables the system to have better imaging quality and lower sensitivity through the reasonable distribution of optical focal length. In an embodiment, $-5.22 \le f6/f \le -1.78$ is satisfied.

A central radius of curvature of the objective surface of the sixth lens L6 is R11, and a central radius of curvature of the image surface of the sixth lens L6 is R12. The following relationship expression is satisfied: $1.29 \le (R11+R12)/(R11-R12) \le 8.65$, in which the shape of the sixth lens L6 is specified. Within the specified range, it is conducive to compensating for the aberration of the off-axis drawing angle and other problems with the development of ultra-thinness and wide-angle. In an embodiment, $2.07 \le (R11+R12)/(R11-R12) \le 6.92$ is satisfied.

An on-axis thickness of the sixth lens L6 is d11, and the total track length of the camera optical lens 10 is TTL. The following relationship expression is satisfied: $0.01 \le d11/TTL \le 0.06$, in which a ratio of the on-axis thickness of the sixth lens L6 to the total track length TTL of the camera optical lens 10 is specified, which is conducive to realizing ultra-thinness. In an embodiment, $0.02 \le d11/TTL \le 0.05$ is satisfied.

In this embodiment, an objective surface of the seventh lens L7 is convex at a proximal-axis position, an image surface thereof is concave at a proximal-axis position, and the seventh lens L7 has a positive refractive force. In other embodiments, the objective surface and the image surface of the seventh lens L7 may also be set to other concave and convex distributions.

A central radius of curvature of the objective surface of the seventh lens L7 is R13, a central radius of curvature of the image surface of the seventh lens L7 is R14. The following relationship expression is satisfied: $7.44 \le (R13+R14)/(R13-R14) \le 84.93$, in which the shape of the seventh lens L7 is specified. Within the specified range, it is conducive to compensating for aberration of the off-axis drawing angle and other problems with the development toward ultra-thinness and wide-angle. In an embodiment, $11.90 \le (R13+R14)/(R13-R14) \le 67.95$ is satisfied.

An on-axis thickness of the seventh lens L7 is d13, and the total track length of the camera optical lens 10 is TTL. The following relationship expression is satisfied: $0.04 \le d13/TTL \le 0.21$, which is conducive to realizing ultra-thinness. In an embodiment, $0.06 \le d13/TTL \le 0.17$ is satisfied.

In this embodiment, the camera optical lens 10 has an aperture value of FNO less than or equal to 2.27, a large aperture, and good imaging performance. In an embodiment, the aperture value FNO is less than or equal to 2.22.

In this embodiment, a field of view (FOV) of the camera optical lens 10 is greater than or equal to 93°, thereby realizing the wide angle.

When the focal length of the camera optical lens 10 of the present application, the focal length of each lens, the on-axis distance from the image surface to the objective surface of the relevant lens, and the on-axis thickness satisfy the above relationship expressions, the camera optical lens 10 can be made to have a large aperture, wide-angle optical camera lens with excellent optical performance.

The camera optical lens 10 of the present application will be described in the following with examples. The symbols recorded in each example are shown below. The units of the focal length, the on-axis distance, the radius of curvature, the on-axis thickness, the position of the inflection point, and the position of the stationary point are mm.

TTL: optical length (on-axis distance from the objective surface of the first lens L1 to the image surface) in mm;

Aperture value FNO: ratio of the effective focal length of the camera optical lens 10 to the Entrance Pupil Diameter (ENPD).

In an embodiment, the objective surface and/or the image surface of the lens may also be provided with an inflection point and/or a stationary point to satisfy the requirement of high-quality imaging, and specific implementable embodiments are described in the following.

Tables 1 and 2 show the design data of the camera optical lens 10 according to the first embodiment of the present application.

TABLE 1

|  | R |  | d |  | nd |  | vd |
| --- | --- | --- | --- | --- | --- | --- | --- |
| S1 | ∞ | d0 = | −2.928 |  |  |  |  |
| R1 | 4.615 | d1 = | 0.693 | nd1 | 1.8040 | v1 | 46.57 |
| R2 | 1.483 | d2 = | 1.153 |  |  |  |  |
| R3 | 39.180 | d3 = | 0.600 | nd2 | 1.6610 | v2 | 20.53 |
| R4 | −6.369 | d4 = | 0.334 |  |  |  |  |
| R5 | 3.085 | d5 = | 0.428 | nd3 | 1.5370 | v3 | 55.98 |
| R6 | 193.497 | d6 = | 0.182 |  |  |  |  |
| R7 | 5.502 | d7 = | 0.210 | nd4 | 1.6610 | v4 | 20.53 |
| R8 | 2.675 | d8 = | 0.030 |  |  |  |  |
| R9 | 3.944 | d9 = | 0.942 | nd5 | 1.5891 | v5 | 61.25 |
| R10 | −2.359 | d10 = | 0.595 |  |  |  |  |
| R11 | 3.238 | d11 = | 0.251 | nd6 | 1.6610 | v6 | 20.53 |
| R12 | 1.974 | d12 = | 0.654 |  |  |  |  |
| R13 | 2.178 | d13 = | 0.813 | nd7 | 1.5370 | v7 | 55.98 |
| R14 | 1.974 | d14 = | 0.425 |  |  |  |  |
| R15 | ∞ | d15 = | 0.210 | ndg | 1.5168 | vg | 64.17 |
| R16 | ∞ | d16 = | 0.481 |  |  |  |  |

The meaning of each symbol is as follows.

S1: aperture;

R: radius of curvature of the optical surface, central radius of curvature in the case of a lens;

R1: radius of curvature of the objective surface of the first lens L1;

R2: radius of curvature of the image surface of the first lens L1;

R3: radius of curvature of the objective surface of the second lens L2;

R4: radius of curvature of the image surface of the second lens L2;

R5: radius of curvature of the objective surface of the third lens L3;

R6: radius of curvature of the image surface of the third lens L3;

R7: radius of curvature of the objective surface of the fourth lens L4;

R8: radius of curvature of the image surface of the fourth lens L4;

R9: radius of curvature of the objective surface of the fifth lens L5;

R10: radius of curvature of the image surface of the fifth lens L5;

R11: radius of curvature of the objective surface of the sixth lens L6;

R12: radius of curvature of the image surface of the sixth lens L6;

R13: radius of curvature of the objective surface of the seventh lens L7;

R14: radius of curvature of the image surface of the seventh lens L7;

R15: radius of curvature of the objective surface of the optical filter GF;

R16: radius of curvature of the image surface of the optical filter GF;

d: on-axis thickness of the lens, and on-axis distance between the lenses;

d0: on-axis distance from the aperture S1 to the objective surface of the first lens L1;

d1: on-axis thickness of the first lens L1;

d2: on-axis distance from the image surface of the first lens L1 to the objective surface of the second lens L2;

d3: on-axis thickness of the second lens L2;

d4: on-axis distance from the image surface of the second lens L2 to the objective surface of the third lens L3;

d5: on-axis thickness of the third lens L3;

d6: on-axis distance from the image surface of the third lens L3 to the objective surface of the fourth lens L4;

d7: on-axis thickness of the fourth lens L4;

d8: on-axis distance from the image surface of the fourth lens L4 to the objective surface of the fifth lens L5;

d9: on-axis thickness of the fifth lens L5;

d10: on-axis distance from the image surface of the fifth lens L5 to the objective surface of the sixth lens L6;

d11: on-axis thickness of the sixth lens L6;

d12: on-axis distance from the image surface of the sixth lens L6 to the objective surface of the seventh lens L7;

d13: on-axis thickness of the seventh lens L7;

d14: on-axis distance from the image surface of the seventh lens L7 to the objective surface of the optical filter GF;

d15: on-axis thickness of the optical filter GF;

d16: on-axis distance from the image surface of the optical filter GF to the image surface;

nd: refractive index of the line d;

nd1: refractive index of the line d of the first lens L1;

nd2: refractive index of the line d of the second lens L2;

nd3: refractive index of the line d of the third lens L3;

nd4: refractive index of the line d of the fourth lens L4;

nd5: refractive index of the line d of the fifth lens L5;

nd6: refractive index of the line d of the sixth lens L6;

nd7: refractive index of the line d of the seventh lens L7;

ndg: refractive index of the line d of the optical filter GF;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

v7: Abbe number of the seventh lens L7;

vg: Abbe number of the optical filter GF.

Table 2 illustrates the aspheric data of each lens in the camera optical lens 10 according to the first embodiment of the present application.

TABLE 2

|  | Cone Coefficient | Aspheric Coefficient |  |  |  |  |
| --- | --- | --- | --- | --- | --- | --- |
|  | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |

TABLE 2-continued

| R3 | 4.3120E+02 | 2.3374E-02 | 6.0871E-02 | -1.5538E-01 | 2.6021E-01 | -2.4728E-01 |
|---|---|---|---|---|---|---|
| R4 | -6.9265E+01 | 6.7109E-02 | -3.3635E-02 | 1.4172E-02 | 6.2433E-02 | -2.4240E-01 |
| R5 | 7.2540E+00 | 4.5964E-02 | -3.8110E-02 | 1.8097E-02 | -1.5157E-02 | -2.9756E-03 |
| R6 | 2.8534E+04 | -6.8177E-03 | -3.6341E-02 | -5.5504E-04 | 3.4470E-02 | -2.7853E-02 |
| R7 | -1.7506E+01 | -1.0440E-01 | -5.1785E-02 | 6.0435E-02 | -2.6440E-02 | -5.5775E-03 |
| R8 | -6.3046E+00 | -6.4922E-02 | -1.7650E-02 | 6.3392E-02 | 6.7571E-02 | -1.8539E-01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | -9.7491E+00 | -8.4666E-01 | 1.9749E+00 | -4.5082E+00 | 4.4930E+00 | 1.7734E+00 |
| R12 | -1.4623E+01 | -8.3810E-01 | 1.6720E+00 | -3.5748E+00 | 1.7338E+00 | 6.2986E+00 |
| R13 | -8.1258E-01 | -3.6222E+00 | -3.8301E+00 | 3.8004E+01 | -8.6129E+01 | 4.8092E+01 |
| R14 | -1.5096E+00 | -5.7452E+00 | 9.0648E+00 | -5.8261E+00 | -4.7690E+00 | 5.2963E+00 |

| | Cone Coefficient | Aspheric Coefficient | | | | |
|---|---|---|---|---|---|---|
| | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 4.3120E+02 | -2.8153E-02 | 2.1662E-01 | 2.2513E-02 | -2.1327E-01 | 9.8961E-02 |
| R4 | -6.9265E+01 | 2.7513E-01 | 5.4265E-02 | -3.1764E-01 | 2.1263E-01 | -3.9739E-02 |
| R5 | 7.2540E+00 | 1.2566E-02 | -2.5709E-03 | -7.9956E-03 | 7.7634E-03 | -2.4310E-03 |
| R6 | 2.8534E+04 | -8.7143E-03 | 2.6094E-02 | -2.3254E-03 | -5.4055E-03 | 2.0210E-03 |
| R7 | -1.7506E+01 | 3.0164E-02 | 5.8683E-03 | -1.8953E-02 | 6.9207E-03 | -1.0578E-03 |
| R8 | -6.3046E+00 | 1.3821E-01 | 7.0211E-02 | -1.8598E-01 | 1.1452E-01 | -2.4035E-02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | -9.7491E+00 | -7.3965E+00 | -1.7043E+00 | 1.6720E+00 | -1.5758E+01 | 4.6922E+00 |
| R12 | -1.4623E+01 | -1.2795E+01 | 8.8734E+00 | 2.2232E+00 | -6.6433E+00 | 2.6447E+00 |
| R13 | -8.1258E-01 | 7.3478E+01 | -6.5137E+01 | -7.4722E+01 | 1.0664E+02 | -3.4564E+01 |
| R14 | -1.5096E+00 | 5.0547E+00 | -1.1030E+01 | 1.0310E+01 | -6.9602E+00 | 2.2935E+00 |

For convenience, the aspheric surfaces of the individual lens surfaces use the aspheric surfaces shown in Equation (1) below. However, the present application is not limited to the polynomial form of the aspheric surfaces expressed in Equation (1).

$$z = \left(cr^2\right)/\left\{1 + \left[1 - (k+1)\left(c^2r^2\right)\right]^{1/2}\right\} + A4r^4 + A6r^6 + A8r^8 + \tag{1}$$
$$A10r^{10} + A12r^{12} + A14r^{14} + A16r^{16} + A18r^{18} + A20r^{20} + A22r^{22}$$

k is the cone coefficient; A4, A6, A8, A10, A12, A14, A16, A18, A20, A22 is the aspheric coefficient; c is the curvature at the center of the optical surface; r is the perpendicular distance between the point on the aspheric curve and the optical axis; and z is the aspheric depth (the perpendicular distance between the point on the aspheric surface at a distance of r from the optical axis and the cut surface tangent to the apex of the aspheric surface on the optical axis).

Tables 3 and 4 show the design data of the inflection point and the stationary point of each lens in the camera optical lens 10 according to the first embodiment of the present application. P1R1, P1R2 represent the objective surface and the image surface of the first lens L1, respectively; P2R1, P2R2 represent the objective surface and the image surface of the second lens L2, respectively; P3R1, P3R2 represent the objective surface and the image surface of the third lens L3, respectively; P4R1, P4R2 represent the objective surface and the image surface of the fourth lens L4, respectively; P5R1, P5R2 represent the objective surface and the image surface of the fifth lens L5, respectively; P6R1, P6R2 represent the objective surface and the image surface of the sixth lens L6, respectively; and P7R1, P7R2 represent the objective surface and the image surface of the seventh lens L7, respectively. The data corresponding to the "position of the inflection point" field is the perpendicular distance from the inflection point set on the surface of each lens to the optical axis of the camera optical lens 10. The data corresponding to the "Position of the stationary point" field is the perpendicular distance from the stationary point set on the surface of each lens to the optical axis of the camera optical lens 10.

TABLE 3

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 0 | / | / |
| P2R2 | 1 | 0.515 | / |
| P3R1 | 0 | / | / |
| P3R2 | 2 | 0.175 | 0.835 |
| P4R1 | 2 | 0.325 | 0.895 |
| P4R2 | 0 | / | / |
| P5R1 | 0 | / | / |
| P5R2 | 0 | / | / |
| P6R1 | 1 | 0.405 | / |
| P6R2 | 2 | 0.545 | 1.595 |
| P7R1 | 2 | 0.635 | 1.935 |
| P7R2 | 1 | 0.845 | / |

TABLE 4

| | Number of Stationary Points | Position of Stationary Point 1 |
|---|---|---|
| P1R1 | 0 | / |
| P1R2 | 0 | / |
| P2R1 | 0 | / |
| P2R2 | 1 | 0.985 |
| P3R1 | 0 | / |
| P3R2 | 1 | 0.275 |
| P4R1 | 1 | 0.535 |
| P4R2 | 0 | / |
| P5R1 | 0 | / |

TABLE 4-continued

| | Number of Stationary Points | Position of Stationary Point 1 |
|---|---|---|
| P5R2 | 0 | / |
| P6R1 | 1 | 0.755 |
| P6R2 | 1 | 1.095 |
| P7R1 | 1 | 1.215 |
| P7R2 | 1 | 1.825 |

Figure 2:
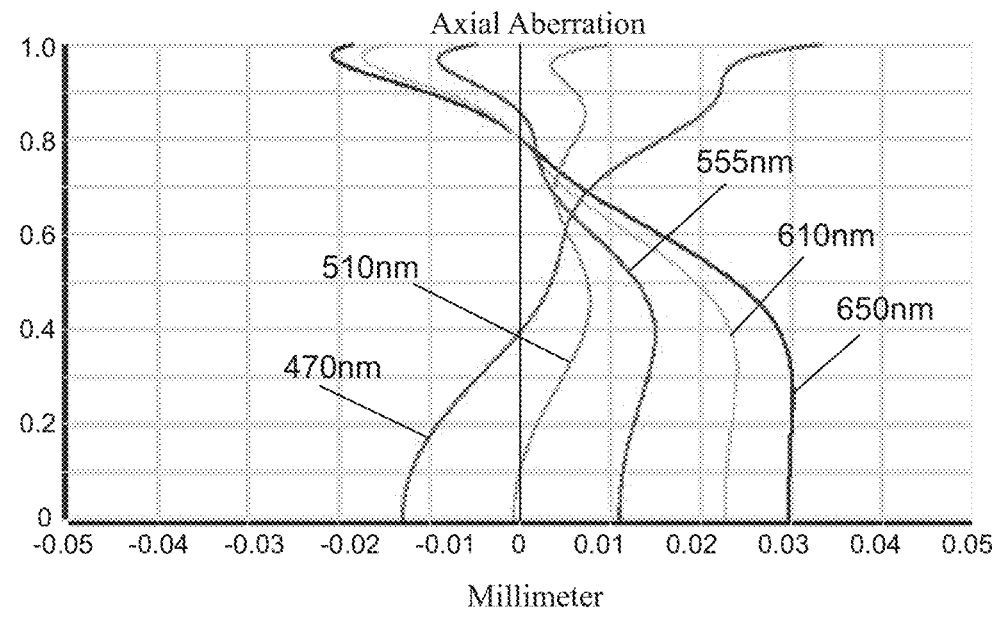
FIG. 2 is a schematic diagram showing the axial aberration of the camera optical lens shown in FIG. 1.
Figure 3:
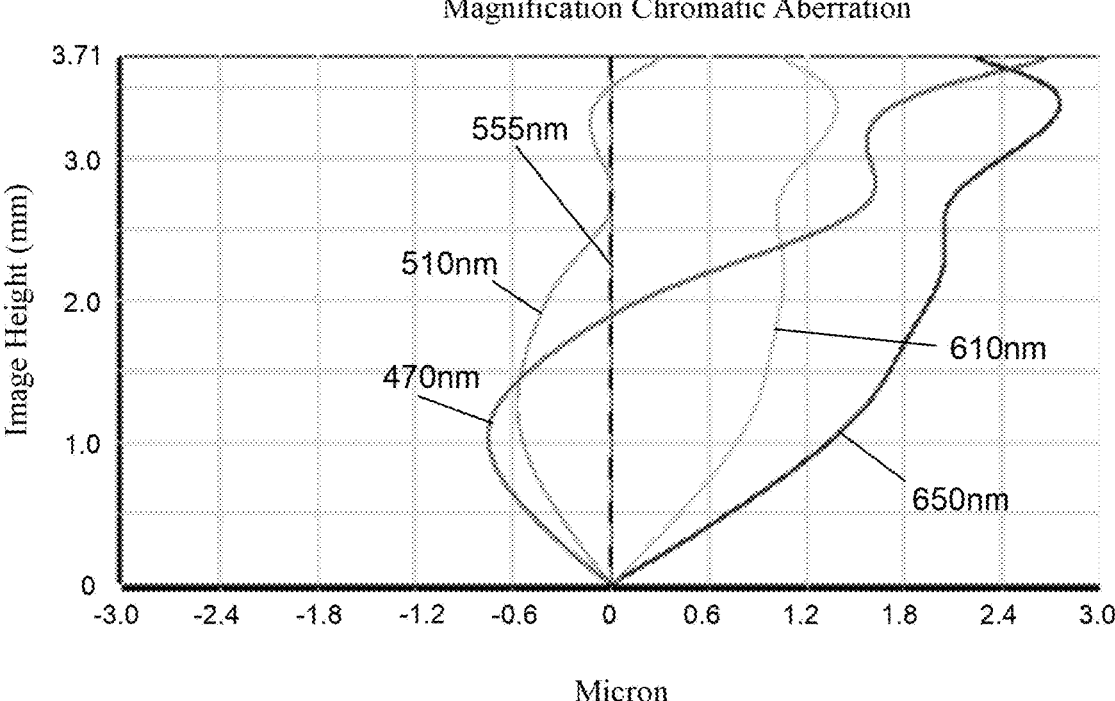
FIG. 3 is a schematic diagram showing the magnification chromatic aberration of the camera optical lens shown in FIG. 1.
Figure 4:
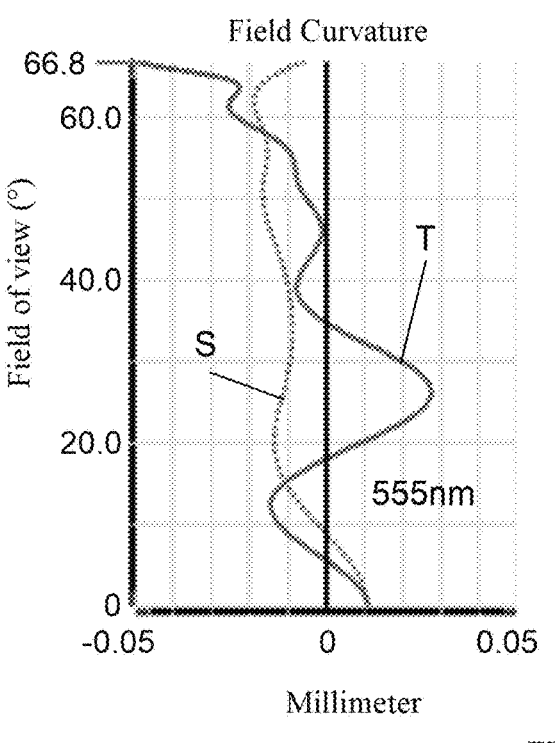
FIG. 4 is a schematic diagram showing the field curvature and distortion of the camera optical lens shown in FIG. 1.
Figure 4:
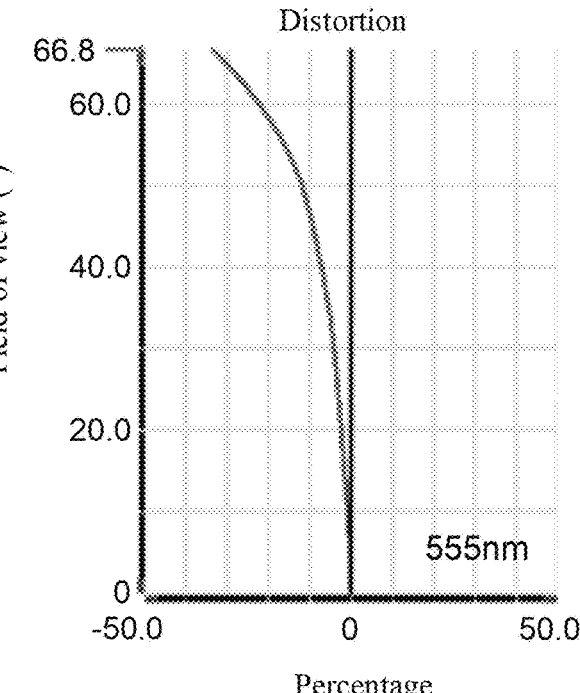
Figure 5:
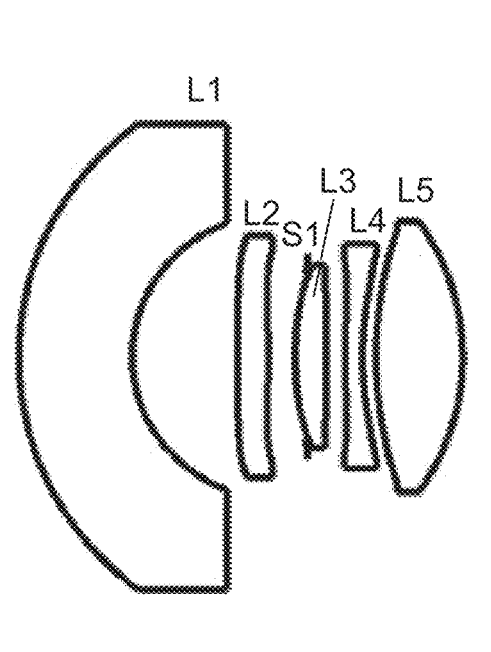
FIG. 5 is a structural schematic diagram of the camera optical lens according to the second embodiment of the present application.
Figure 5:
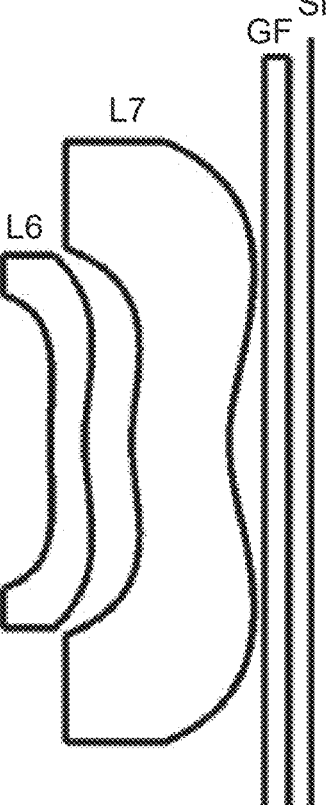

FIGS. 2 and 3 are schematic diagrams showing the axial aberration and magnification chromatic aberration of light with wavelengths of 650 nm, 610 nm, 555 nm, 510 nm, and 470 nm, respectively, after passing through the camera optical lens 10 according to the first embodiment. FIG. 4 is a schematic diagram showing the field curvature and distortion of light having a wavelength of 555 nm after passing through the camera optical lens 10 according to the first embodiment. The field curvature S of FIG. 4 is a field curvature in the arc-sagittal direction, and the field curvature T is a field curvature in the meridional direction.

Table 29 in the following shows various values and the values corresponding to the parameters specified in the relationship expressions in each of the first embodiment, second embodiment, third embodiment, fourth embodiment, fifth embodiment, sixth embodiment, and the first comparison example.

As shown in Table 29, the first embodiment satisfies each of the relationship expressions.

In this embodiment, the camera optical lens 10 has an Entrance Pupil Diameter (ENPD) of 1.073 mm, a full field-of-view image height (IH) of 3.711 mm, and a field of view (FOV) of 133.58° in the diagonal direction. The camera optical lens 10 has excellent optical performance, featuring a large aperture, ultra-thinness, a balance between wide-angle capability and compactness, low aberration, low chromatic aberration, and high resolution up to 5M. Additionally, it possesses a long back focal length for ease of assembly and is cost-effective.

Second Embodiment

The second embodiment is basically the same as the first embodiment, the meaning of the symbols is the same as that of the first embodiment, and only the differences are listed below.

Tables 5 and 6 show the design data of the camera optical lens 20 according to the second embodiment of the present application.

TABLE 5

| | R | | d | | nd | | vd | |
|---|---|---|---|---|---|---|---|---|
| S1 | ∞ | d0 = | −2.546 | | | | | |
| R1 | 2.702 | d1 = | 1.000 | nd1 | 1.8040 | v1 | 46.57 | |
| R2 | 1.319 | d2 = | 0.929 | | | | | |
| R3 | 584.551 | d3 = | 0.268 | nd2 | 1.6610 | v2 | 20.53 | |
| R4 | −9.262 | d4 = | 0.238 | | | | | |
| R5 | 3.094 | d5 = | 0.273 | nd3 | 1.5370 | v3 | 55.98 | |
| R6 | 197.780 | d6 = | 0.170 | | | | | |
| R7 | 5.863 | d7 = | 0.153 | nd4 | 1.6610 | v4 | 20.53 | |
| R8 | 2.687 | d8 = | 0.120 | | | | | |
| R9 | 3.761 | d9 = | 0.763 | nd5 | 1.5891 | v5 | 61.25 | |
| R10 | −2.190 | d10 = | 1.131 | | | | | |
| R11 | 5.200 | d11 = | 0.309 | nd6 | 1.6610 | v6 | 20.53 | |
| R12 | 2.299 | d12 = | 0.414 | | | | | |
| R13 | 2.136 | d13 = | 0.858 | nd7 | 1.5370 | v7 | 55.98 | |
| R14 | 1.867 | d14 = | 0.314 | | | | | |
| R15 | ∞ | d15 = | 0.210 | ndg | 1.5168 | vg | 64.17 | |
| R16 | ∞ | d16 = | 0.200 | | | | | |

Table 6 illustrates the aspheric data of each lens in the camera optical lens 20 according to the second embodiment of the present application.

TABLE 6

| | Cone Coefficient | Aspheric Coefficient | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 1.1576E−01 | 9.6925E−02 | −1.0929E−01 | 2.6691E−01 | −1.3791E−01 | 6.8892E−02 |
| R4 | −1.9517E+02 | 1.1681E−01 | −1.0995E−02 | 2.8618E−02 | 1.0171E−01 | −1.9268E−01 |
| R5 | 6.9569E+00 | 3.8012E−02 | −4.3851E−02 | 1.9059E−02 | −1.0465E−02 | −3.9336E−05 |
| R6 | 5.4878E+04 | 5.9753E−03 | −3.8509E−02 | −8.5156E−03 | 3.4369E−02 | −2.5250E−02 |
| R7 | 1.5545E+01 | −9.6562E−02 | −4.2799E−02 | 5.9164E−02 | −3.1872E−02 | −1.2197E−02 |
| R8 | −7.6365E+00 | −5.2513E−02 | −1.7349E−02 | 6.3207E−02 | 6.3964E−02 | −1.8890E−01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −1.4060E+01 | −8.8989E−01 | 1.9702E+00 | −4.5522E+00 | 4.3933E+00 | 1.7566E+00 |
| R12 | −3.0898E+01 | −1.0180E+00 | 1.8341E+00 | −3.7882E+00 | 1.6879E+00 | 6.2301E+00 |
| R13 | −1.6611E+01 | −3.3947E+00 | −2.2963E+00 | 3.0304E+01 | −8.0507E+01 | 4.0146E+01 |
| R14 | −6.9144E+00 | −4.1886E+00 | 8.2055E+00 | −6.2720E+00 | −8.6872E+00 | 1.0979E+01 |

| | Cone Coefficient | Aspheric Coefficient | | | | |
|---|---|---|---|---|---|---|
| | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 1.1576E−01 | 3.3302E−01 | 6.4784E−02 | −2.6452E−01 | −1.1676E−01 | 0.0000E+00 |
| R4 | −1.9517E+02 | 3.2194E−01 | 3.2751E−02 | −3.3190E−01 | 2.5161E−01 | 5.8574E−02 |
| R5 | 6.9569E+00 | 1.2667E−02 | −9.9444E−04 | −7.5031E−03 | 7.6261E−03 | 1.5693E−03 |
| R6 | 5.4878E+04 | −4.4001E−03 | 3.2290E−02 | 1.3568E−03 | −3.7113E−03 | 3.5423E−03 |
| R7 | 1.5545E+01 | 2.6373E−02 | 4.7272E−03 | −1.5539E−02 | 7.4408E−03 | −1.3103E−03 |

TABLE 6-continued

| | | | | | | |
|---|---|---|---|---|---|---|
| R8 | −7.6365E+00 | 1.3438E−01 | 6.7545E−02 | −1.8561E−01 | 1.1894E−01 | −2.4595E−02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −1.4060E+01 | −7.3623E+00 | −1.6762E+00 | 1.6732E+00 | −1.5854E+01 | 4.4769E+00 |
| R12 | −3.0898E+01 | −1.2931E+01 | 8.8437E+00 | 2.3701E+00 | −6.4717E+00 | 2.6215E+00 |
| R13 | −1.6611E+01 | 6.2615E+01 | −3.2542E+01 | 9.4186E−02 | 1.3478E+02 | −3.9380E+02 |
| R14 | −6.9144E+00 | 6.7475E+00 | −1.2286E+01 | 6.8693E+00 | −8.5292E+00 | 4.6949E+00 |

Tables 7 and 8 show the design data of the inflection point and the stationary point of each lens in the camera optical lens 20 according to the second embodiment of the present application.

TABLE 7

| | Number of Inflection Points | Position of Inflection Point 1 | Position of Inflection Point 2 | Position of Inflection Point 3 |
|---|---|---|---|---|
| P1R1 | 0 | / | / | / |
| P1R2 | 0 | / | / | / |
| P2R1 | 0 | / | / | / |
| P2R2 | 1 | 0.335 | / | / |
| P3R1 | 0 | / | / | / |
| P3R2 | 3 | 0.295 | 0.745 | 0.845 |
| P4R1 | 2 | 0.355 | 0.945 | / |
| P4R2 | 0 | / | / | / |
| P5R1 | 0 | / | / | / |
| P5R2 | 0 | / | / | / |
| P6R1 | 1 | 0.305 | / | / |
| P6R2 | 2 | 0.425 | 1.685 | / |
| P7R1 | 1 | 0.445 | / | / |
| P7R2 | 1 | 0.685 | / | / |

TABLE 8

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 0 | / | / |
| P2R2 | 1 | 0.575 | / |
| P3R1 | 0 | / | / |
| P3R2 | 2 | 0.405 | 0.825 |
| P4R1 | 1 | 0.595 | / |
| P4R2 | 0 | / | / |
| P5R1 | 0 | / | / |
| P5R2 | 0 | / | / |
| P6R1 | 1 | 0.565 | / |
| P6R2 | 2 | 0.885 | 1.855 |
| P7R1 | 1 | 0.845 | / |
| P7R2 | 1 | 1.545 | / |

Figure 6:
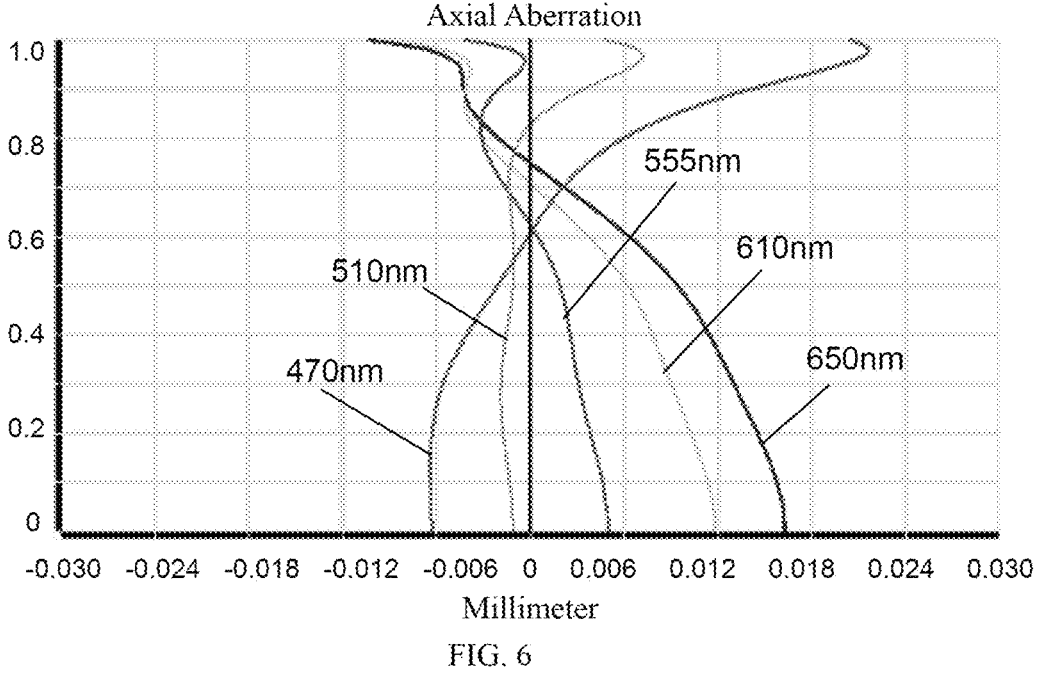
FIG. 6 is a schematic diagram showing the axial aberration of the camera optical lens shown in FIG. 5.
Figure 7:
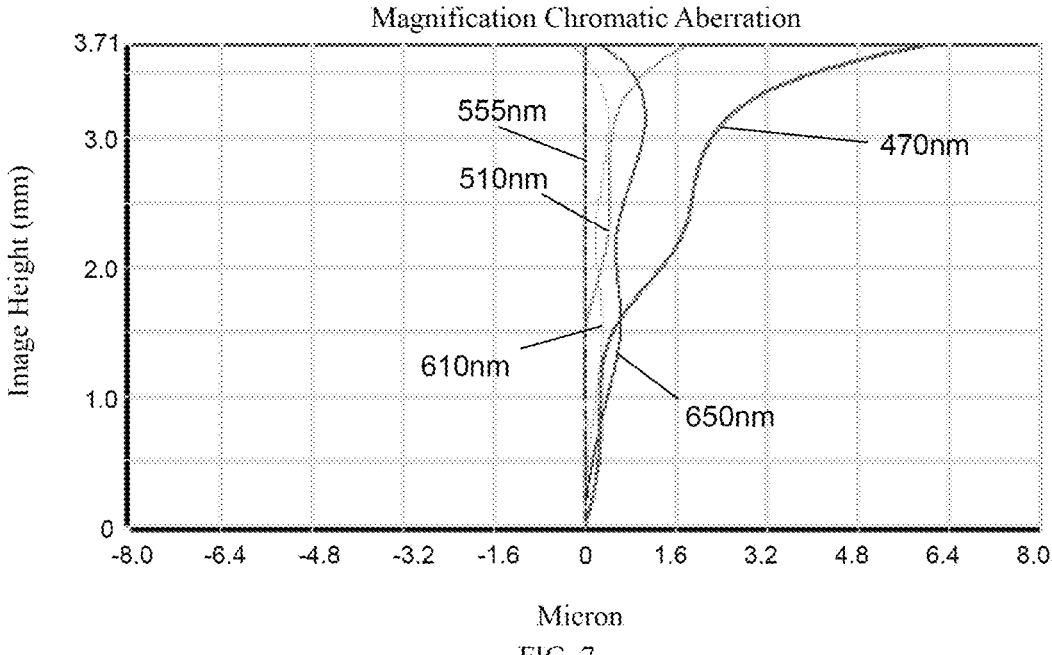
FIG. 7 is a schematic diagram showing the magnification chromatic aberration of the camera optical lens shown in FIG. 5.
Figure 8:
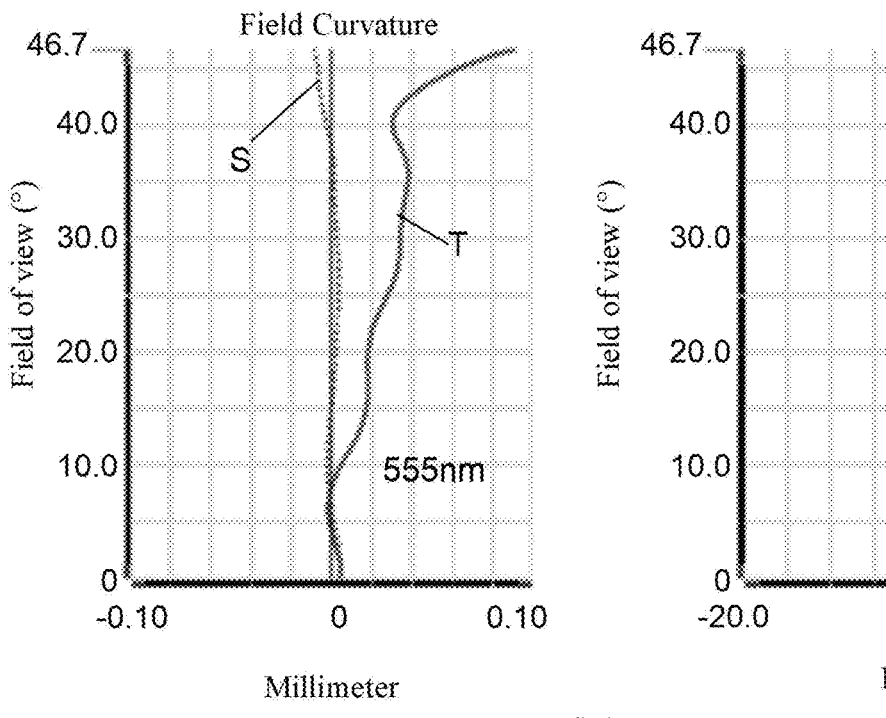
FIG. 8 is a schematic diagram showing the field curvature and distortion of the camera optical lens shown in FIG. 5.
Figure 9:
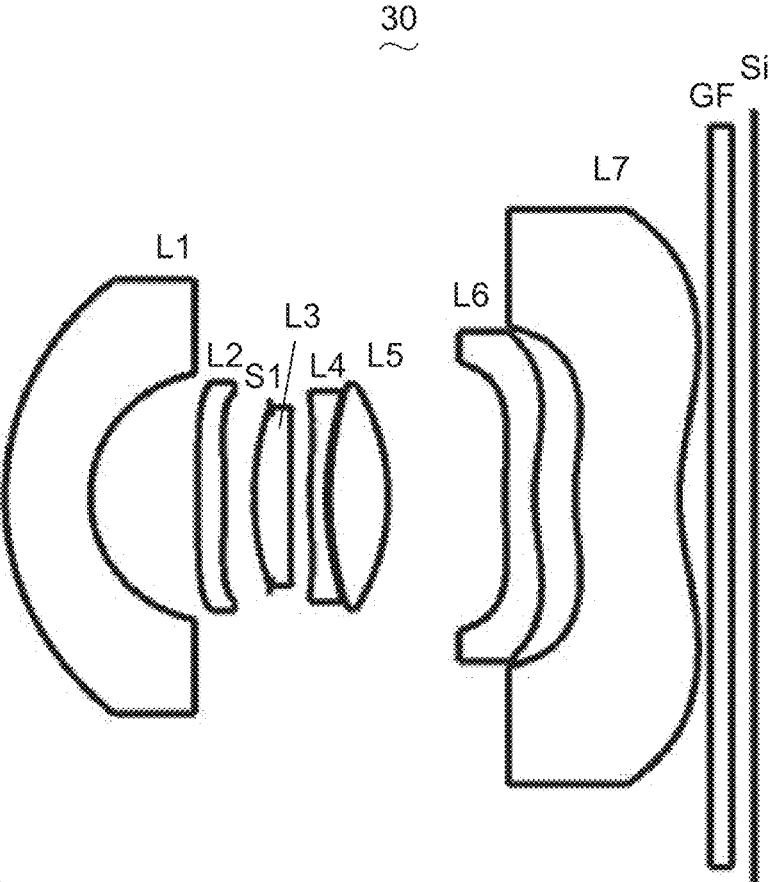
FIG. 9 is a structural schematic diagram of the camera optical lens according to the third embodiment of the present application.

FIGS. 6 and 7 are schematic diagrams showing the axial aberration and magnification chromatic aberration of light with wavelengths of 650 nm, 610 nm, 555 nm, 510 nm, and 470 nm, respectively, after passing through the camera optical lens 20 according to the second embodiment. FIG. 8 is a schematic diagram showing the field curvature and distortion of light with a wavelength of 555 nm after passing through the camera optical lens 20 according to the second embodiment. The field curvature S of FIG. 8 is the field curvature in the arc-sagittal direction, and T is the field curvature in the meridional direction.

As shown in Table 29, the second embodiment satisfies each of the relationship expressions.

In this embodiment, the camera optical lens 20 has an Entrance Pupil Diameter (ENPD) of 1.377 mm, a full field-of-view image height (IH) of 3.711 mm, and a field of view (FOV) of 93.42° in the diagonal direction. The camera optical lens 20 has excellent optical performance, featuring a large aperture, ultra-thinness, a balance between wide-angle capability and compactness, low aberration, low chromatic aberration, and high resolution up to 5M. Additionally, it possesses a long back focal length for ease of assembly and is cost-effective.

Third Embodiment

The third embodiment is basically the same as the first embodiment, the meaning of the symbols is the same as that of the first embodiment, and only the differences are listed below.

In this embodiment, the objective surface of the second lens L2 is concave at the proximal-axis position.

Tables 9 and 10 show the design data of the camera optical lens 30 according to the third embodiment of the present application.

TABLE 9

| | R | d | | nd | | vd | |
|---|---|---|---|---|---|---|---|
| S1 | ∞ | d0 = | −2.473 | | | | |
| R1 | 2.694 | d1 = | 0.796 | nd1 | 1.7000 | v1 | 48.11 |
| R2 | 1.225 | d2 = | 1.006 | | | | |
| R3 | −74.076 | d3 = | 0.244 | nd2 | 1.6610 | v2 | 20.53 |
| R4 | −7.716 | d4 = | 0.281 | | | | |
| R5 | 3.084 | d5 = | 0.344 | nd3 | 1.5370 | v3 | 55.98 |
| R6 | 177.131 | d6 = | 0.186 | | | | |
| R7 | 5.046 | d7 = | 0.149 | nd4 | 1.6610 | v4 | 20.53 |
| R8 | 2.479 | d8 = | 0.030 | | | | |
| R9 | 3.588 | d9 = | 0.547 | nd5 | 1.5891 | v5 | 61.25 |
| R10 | −2.145 | d10 = | 1.090 | | | | |
| R11 | 4.202 | d11 = | 0.277 | nd6 | 1.6610 | v6 | 20.53 |
| R12 | 2.114 | d12 = | 0.387 | | | | |
| R13 | 2.740 | d13 = | 0.973 | nd7 | 1.5370 | v7 | 55.98 |
| R14 | 2.494 | d14 = | 0.280 | | | | |
| R15 | ∞ | d15 = | 0.210 | ndg | 1.5168 | vg | 64.17 |
| R16 | ∞ | d16 = | 0.203 | | | | |

Table 10 illustrates the aspheric data of each lens in the camera optical lens 30 according to the third embodiment of the present application.

TABLE 10

| | Cone Coefficient | Aspheric Coefficient | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 4.3434E+03 | 1.4759E−01 | 1.5198E−01 | −8.0154E−02 | 3.4102E−02 | −1.4337E−01 |
| R4 | −1.0107E+02 | 1.4243E−01 | 1.6939E−01 | 1.6478E−02 | 1.5301E−01 | −1.6790E−01 |
| R5 | 7.0284E+00 | 3.9491E−02 | −4.2163E−02 | 2.0781E−02 | −1.1797E−02 | 1.1687E−03 |
| R6 | 4.4951E+04 | 4.8567E−03 | −4.0893E−02 | −4.4648E−03 | 3.5624E−02 | −2.1445E−02 |
| R7 | −2.5166E+00 | −9.0410E−02 | −4.7440E−02 | 5.9028E−02 | −2.8970E−02 | −8.0027E−03 |
| R8 | −5.2616E+00 | −6.6822E−02 | −1.7534E−02 | 6.3788E−02 | 6.6076E−02 | −1.8845E−01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −4.5626E+01 | −8.5651E−01 | 1.8734E+00 | −4.5129E+00 | 4.3967E+00 | 1.6666E+00 |
| R12 | −2.3993E+01 | −1.3108E+00 | 2.3488E+00 | −3.9657E+00 | 1.2434E+00 | 6.0194E+00 |
| R13 | −2.2974E+01 | −3.3585E+00 | −4.6665E+00 | 3.6821E+01 | −7.9758E+01 | 3.7956E+01 |
| R14 | −7.4130E−01 | −6.5421E+00 | 8.6469E+00 | −2.4356E+00 | −9.2375E+00 | 5.4834E+00 |

| | Cone Coefficient | Aspheric Coefficient | | | | |
|---|---|---|---|---|---|---|
| | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 4.3434E+03 | 1.1114E−01 | 3.8021E−01 | 1.5477E−01 | −1.8153E−01 | −8.7273E−02 |
| R4 | −1.0107E+02 | 2.8309E−01 | 5.1960E−02 | −2.8203E−01 | 3.0262E−01 | 1.2279E−01 |
| R5 | 7.0284E+00 | 1.6060E−02 | −5.6514E−04 | −7.1584E−03 | 9.5724E−03 | −2.1118E−03 |
| R6 | 4.4951E+04 | −7.1358E−04 | 3.4961E−02 | 7.7565E−03 | −2.6218E−03 | −3.1523E−03 |
| R7 | −2.5166E+00 | 2.9357E−02 | 6.3197E−03 | −1.6645E−02 | 9.8943E−03 | 6.1320E−04 |
| R8 | −5.2616E+00 | 1.3548E−01 | 6.8822E−02 | −1.8656E−01 | 1.1649E−01 | −2.0511E−02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −4.5626E+01 | −7.4607E+00 | −1.7394E+00 | 1.6663E+01 | −1.5854E+01 | 4.5065E+00 |
| R12 | −2.3993E+01 | −1.3012E+01 | 8.6436E+00 | 2.5924E+00 | −5.9502E+00 | 3.8810E+00 |
| R13 | −2.2974E+01 | 3.9260E+01 | −1.3882E+01 | −8.7856E+01 | 1.7693E+02 | −1.2425E+02 |
| R14 | −7.4130E−01 | 6.3437E+00 | −9.8039E+00 | 1.0453E+01 | −7.3481E+00 | 1.4794E+00 |

Tables 11 and 12 show the design data of the inflection point and the stationary point of each lens in the camera optical lens 30 according to the third embodiment of the present application.

TABLE 11

| | Number of Inflection Points | Position of Inflection Point 1 | Position of Inflection Point 2 | Position of Inflection Point 3 |
|---|---|---|---|---|
| P1R1 | 0 | / | / | / |
| P1R2 | 0 | / | / | / |
| P2R1 | 2 | 0.175 | 1.115 | / |
| P2R2 | 1 | 0.335 | / | / |
| P3R1 | 0 | / | / | / |
| P3R2 | 3 | 0.285 | 0.705 | 0.835 |
| P4R1 | 2 | 0.365 | 0.855 | / |
| P4R2 | 0 | / | / | / |
| P5R1 | 0 | / | / | / |
| P5R2 | 0 | / | / | / |
| P6R1 | 1 | 0.305 | / | / |
| P6R2 | 2 | 0.415 | 1.525 | / |
| P7R1 | 1 | 0.415 | / | / |
| P7R2 | 1 | 0.735 | / | / |

TABLE 12

| | Number of Stationary Points | Position of Stationary Point 1 | Position of Stationary Point 2 |
|---|---|---|---|
| P1R1 | 0 | / | / |
| P1R2 | 0 | / | / |

TABLE 12-continued

| | Number of Stationary Points | Position of Stationary Point 1 | Position of Stationary Point 2 |
|---|---|---|---|
| P2R1 | 1 | 0.285 | / |
| P2R2 | 1 | 0.565 | / |
| P3R1 | 0 | / | / |
| P3R2 | 2 | 0.405 | 0.785 |
| P4R1 | 2 | 0.625 | 0.935 |
| P4R2 | 0 | / | / |
| P5R1 | 0 | / | / |
| P5R2 | 0 | / | / |
| P6R1 | 1 | 0.565 | / |
| P6R2 | 2 | 0.855 | 1.655 |
| P7R1 | 1 | 0.765 | / |
| P7R2 | 1 | 1.465 | / |

Figure 10:
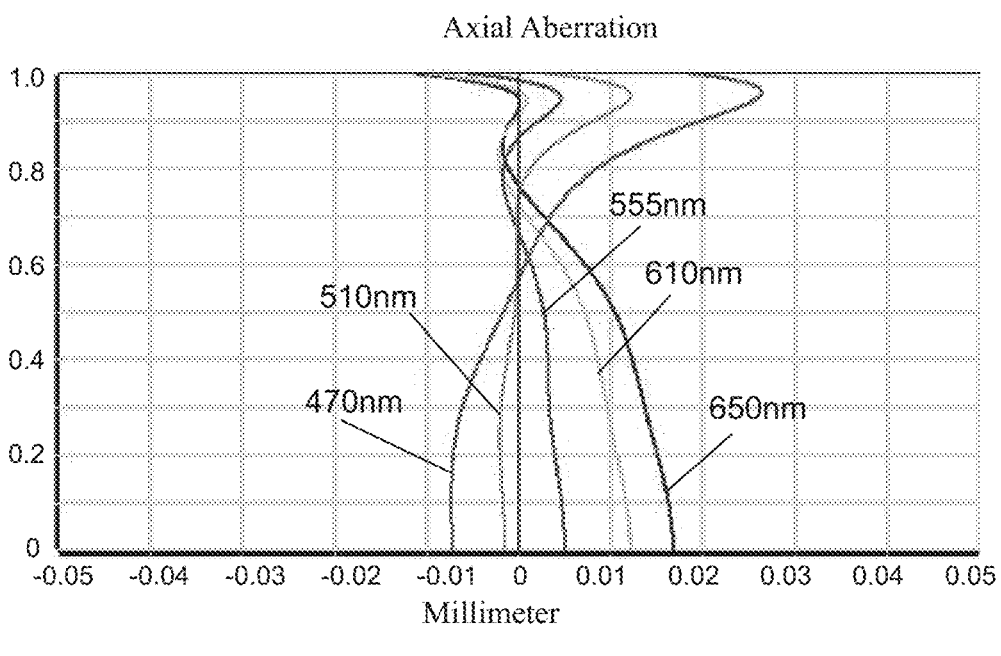
FIG. 10 is a schematic diagram showing the axial aberration of the camera optical lens shown in FIG. 9.
Figure 11:
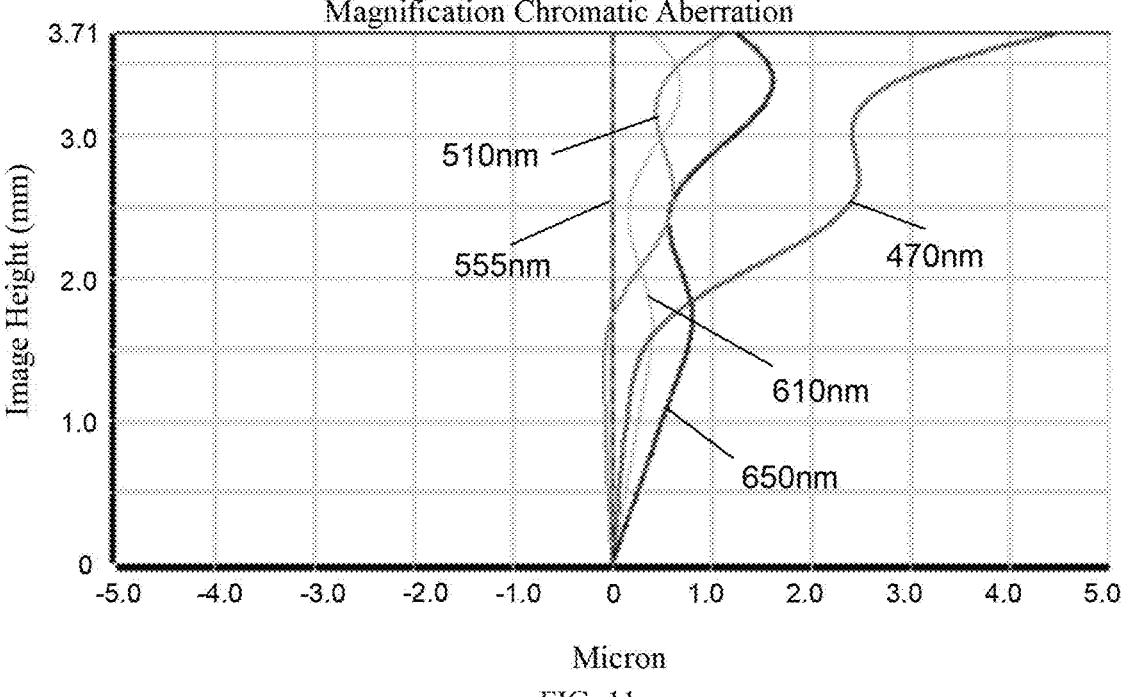
FIG. 11 is a schematic diagram showing the magnification chromatic aberration of the camera optical lens shown in FIG. 9.
Figure 12:
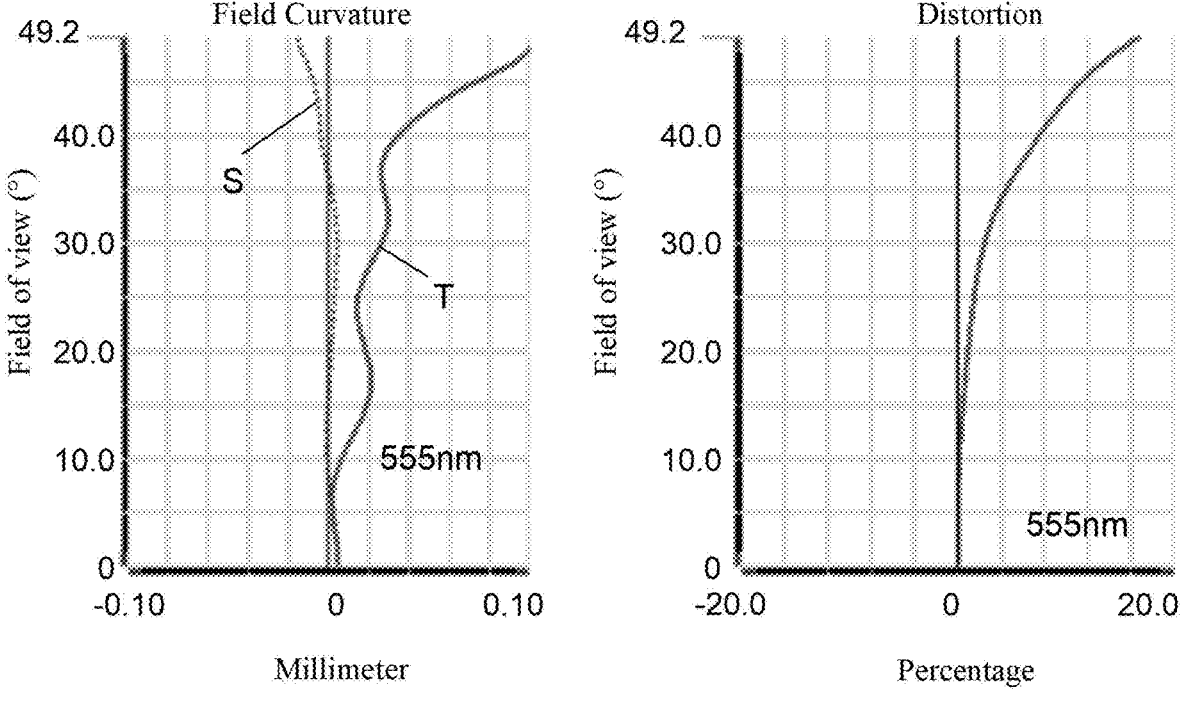
FIG. 12 is a schematic diagram showing the field curvature and distortion of the camera optical lens shown in FIG. 9.
Figure 13:
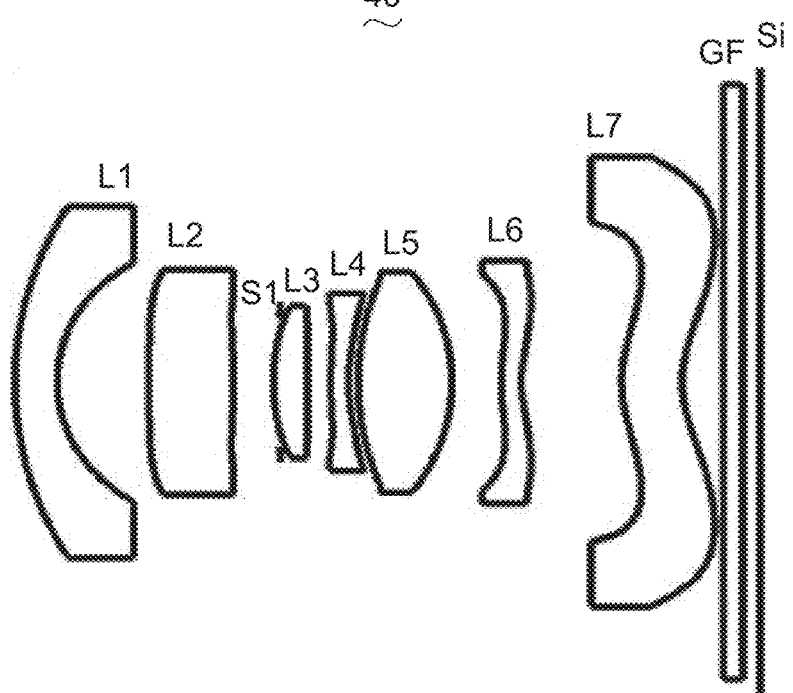
FIG. 13 is a structural schematic diagram of the camera optical lens according to the fourth embodiment of the present application.

FIGS. 10 and 11 are schematic diagrams showing the axial aberration and magnification chromatic aberration of light with wavelengths of 650 nm, 610 nm, 555 nm, 510 nm, and 470 nm, respectively, after passing through the camera optical lens 30 according to the third embodiment. FIG. 12 is a schematic diagram showing the field curvature and distortion of light with a wavelength of 555 nm after passing through the camera optical lens 30 according to the third embodiment. The field curvature S of FIG. 12 is the field curvature in the arc-sagittal direction, and T is the field curvature in the meridional direction.

As shown in Table 29, the third embodiment satisfies each of the relationship expressions.

In this embodiment, the camera optical lens 30 has an Entrance Pupil Diameter (ENPD) of 1.242 mm, a full field-of-view image height (IH) of 3.711 mm, and a field of view (FOV) of 98.48° in the diagonal direction. The camera optical lens 30 has excellent optical performance, featuring a large aperture, ultra-thinness, a balance between wide-angle capability and compactness, low aberration, low chromatic aberration, and high resolution up to 5M. Additionally, it possesses a long back focal length for ease of assembly and is cost-effective.

Fourth Embodiment

The fourth embodiment is basically the same as the first embodiment, the meaning of the symbols is the same as that of the first embodiment, and only the differences are listed below.

In this embodiment, the objective surface of the second lens L2 is concave at the proximal-axis position.

Tables 13 and 14 show the design data of the camera optical lens 40 according to the fourth embodiment of the present application.

TABLE 13

| | R | d | | nd | | vd |
|---|---|---|---|---|---|---|
| S1 | ∞ | d0 = | -2.927 | | | |
| R1 | 4.136 | d1 = | 0.466 | nd1 | 2.1014 | v1 | 54.26 |
| R2 | 1.655 | d2 = | 1.009 | | | |
| R3 | -104.203 | d3 = | 0.928 | nd2 | 1.6610 | v2 | 20.53 |
| R4 | -5.965 | d4 = | 0.446 | | | |
| R5 | 3.089 | d5 = | 0.371 | nd3 | 1.5370 | v3 | 55.98 |
| R6 | 237.330 | d6 = | 0.253 | | | |
| R7 | 4.762 | d7 = | 0.199 | nd4 | 1.6610 | v4 | 20.53 |
| R8 | 2.263 | d8 = | 0.105 | | | |
| R9 | 3.352 | d9 = | 1.030 | nd5 | 1.5891 | v5 | 61.25 |
| R10 | -2.229 | d10 = | 0.541 | | | |
| R11 | 2.139 | d11 = | 0.222 | nd6 | 1.6610 | v6 | 20.53 |
| R12 | 1.507 | d12 = | 1.110 | | | |
| R13 | 1.641 | d13 = | 0.663 | nd7 | 1.5370 | v7 | 55.98 |
| R14 | 1.435 | d14 = | 0.454 | | | |
| R15 | ∞ | d15 = | 0.210 | ndg | 1.5168 | vg | 64.17 |
| R16 | ∞ | d16 = | 0.198 | | | |

Table 14 illustrates the aspheric data of each lens in the camera optical lens 40 according to the fourth embodiment of the present application.

TABLE 14

| | Cone Coefficient | Aspheric Coefficient | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | -8.2151E+05 | 1.1956E-01 | 6.6059E-02 | -1.3685E-01 | 2.8424E-01 | -2.5192E-01 |
| R4 | -4.2109E+01 | 1.1027E-01 | -3.1489E-04 | -2.6178E-02 | 8.7571E-02 | -2.1706E-01 |
| R5 | 7.1014E+00 | 4.2424E-02 | -4.5644E-02 | 2.8871E-02 | -2.1842E-02 | 1.7262E-03 |
| R6 | 6.2037E+04 | 3.0327E-03 | -3.4245E-02 | -7.9382E-03 | 3.9473E-02 | -2.1030E-02 |
| R7 | -1.4857E+01 | -1.0147E-01 | -4.7758E-02 | 5.6826E-02 | -2.1218E-02 | -2.8537E-03 |
| R8 | -6.3462E+00 | -6.5799E-02 | -2.8008E-02 | 6.9147E-02 | 6.6508E-02 | -1.8648E-01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | -2.5557E+01 | -9.0875E-01 | 1.9606E+00 | -4.5968E+00 | 4.4894E+00 | 1.7457E+00 |
| R12 | -1.6156E+01 | -1.1935E+00 | 2.2264E+00 | -4.6311E+00 | 2.9734E+00 | 7.2418E+00 |
| R13 | -6.1107E+00 | -7.9456E-01 | -8.2687E+00 | 3.4422E+01 | -6.6420E+01 | 4.4990E+01 |
| R14 | -2.6070E+00 | -6.4601E+00 | 1.2610E+01 | -9.8120E+00 | -4.1578E+00 | 3.2305E-01 |

| | Cone Coefficient | Aspheric Coefficient | | | | |
|---|---|---|---|---|---|---|
| | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+0 | 0.0000E+00 | 0.0000E+00 | 0.0000E+00 | 0.0000E+00 |
| R3 | -8.2151E+05 | -3.2939E-02 | 2.1885E-01 | 2.2806E-02 | -2.0908E-01 | 9.4319E-02 |
| R4 | -4.2109E+01 | 2.9611E-01 | 5.3559E-02 | -3.3010E-01 | 1.5122E-01 | 1.1614E-02 |
| R5 | 7.1014E+00 | 1.1421E-02 | -2.3455E-03 | -7.9047E-03 | 7.8935E-03 | -2.3803E-03 |
| R6 | 6.2037E+04 | -1.0829E-02 | 2.1541E-02 | 2.5917E-03 | -5.5120E-03 | 1.3467E-03 |
| R7 | -1.4857E+01 | 2.5965E-02 | 1.4933E-03 | -1.6640E-02 | 9.3383E-03 | -2.4013E-03 |
| R8 | -6.3462E+00 | 1.3767E-01 | 7.0536E-02 | -1.8539E-01 | 1.1456E-01 | -2.4105E-02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | -2.5557E+01 | -7.4094E+00 | -1.5180E+00 | 1.6882E+01 | -1.5774E+01 | 4.5452E+00 |
| R12 | -1.6156E+01 | -1.4331E+01 | 7.5064E+00 | 8.8305E+00 | -1.1216E+01 | 2.2233E+00 |
| R13 | -6.1107E+00 | 4.7098E+01 | -1.3395E+01 | -2.8004E+01 | 4.2435E+02 | -4.1721E+02 |
| R14 | -2.6070E+00 | 8.9983E+00 | 1.5723E+01 | -5.6924E+01 | 5.4604E+01 | -1.7118E+01 |

Tables 15 and 16 show the design data of the inflection point and the stationary point of each lens in the camera optical lens 40 according to the fourth embodiment of the present application.

TABLE 15

| | Number of Inflection Points | Position of Inflection Point 1 | Position of Inflection Point 2 | Position of Inflection Point 3 |
|---|---|---|---|---|
| P1R1 | 0 | / | / | / |
| P1R2 | 0 | / | / | / |
| P2R1 | 1 | 0.105 | / | / |
| P2R2 | 1 | 0.435 | / | / |
| P3R1 | 0 | / | / | / |
| P3R2 | 3 | 0.265 | 0.785 | 0.955 |
| P4R1 | 2 | 0.345 | 0.885 | / |
| P4R2 | 0 | / | / | / |
| P5R1 | 0 | / | / | / |
| P5R2 | 0 | / | / | / |
| P6R1 | 1 | 0.345 | / | / |
| P6R2 | 2 | 0.445 | 1.305 | / |
| P7R1 | 1 | 0.675 | / | / |
| P7R2 | 2 | 0.765 | 2.715 | / |

TABLE 16

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 1 | 0.195 | / |
| P2R2 | 1 | 0.755 | / |
| P3R1 | 0 | / | / |
| P3R2 | 2 | 0.375 | 0.875 |
| P4R1 | 2 | 0.585 | 1.025 |
| P4R2 | 0 | / | / |
| P5R1 | 0 | / | / |
| P5R2 | 0 | / | / |
| P6R1 | 1 | 0.675 | / |
| P6R2 | 2 | 0.975 | 1.465 |
| P7R1 | 1 | 1.295 | / |
| P7R2 | 1 | 1.735 | / |

Figure 14:
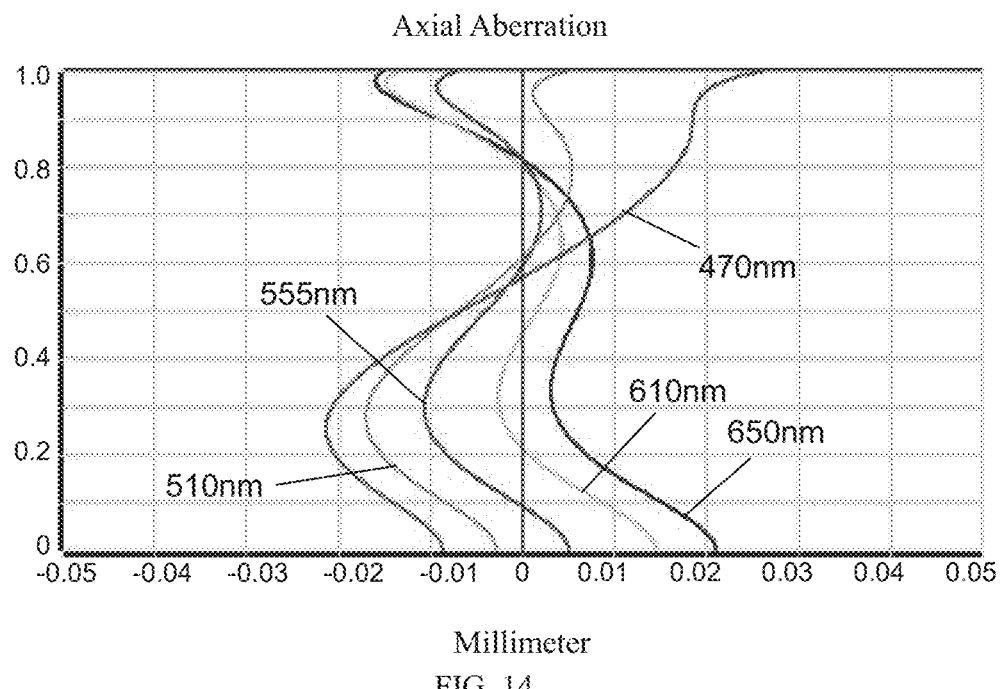
FIG. 14 is a schematic diagram showing the axial aberration of the camera optical lens shown in FIG. 13.
Figure 15:
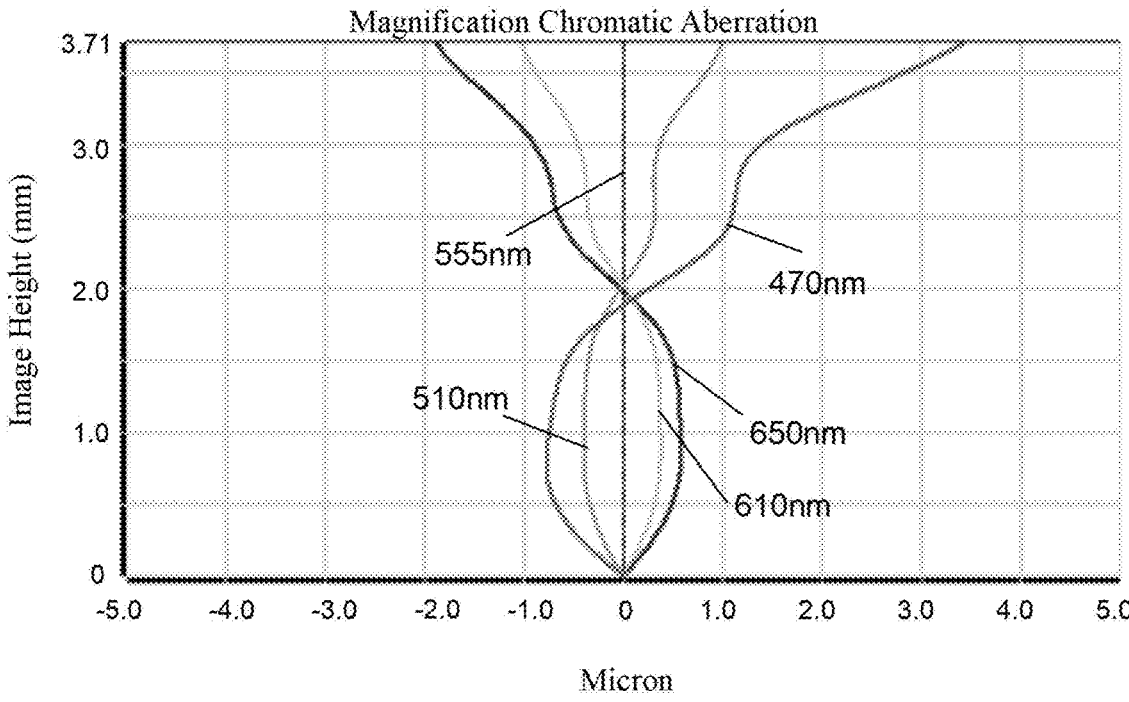
FIG. 15 is a schematic diagram showing the magnification chromatic aberration of the camera optical lens shown in FIG. 13.
Figure 16:
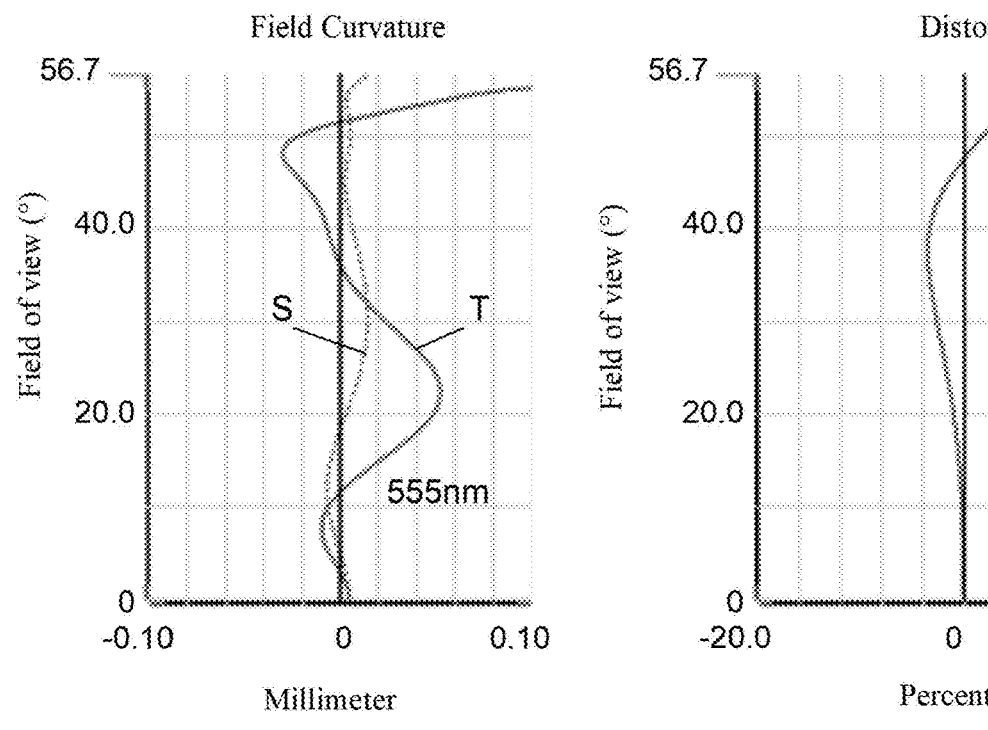
FIG. 16 is a schematic diagram showing the field curvature and distortion of the camera optical lens shown in FIG. 13.
Figure 17:
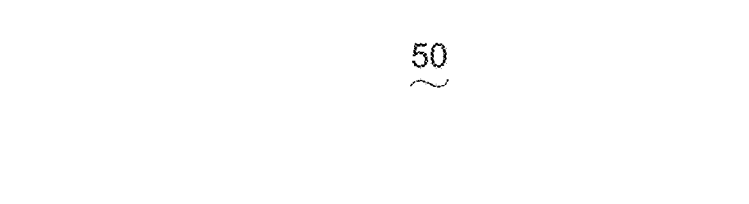
FIG. 17 is a structural schematic diagram of the camera optical lens according to the fifth embodiment of the present application.
Figure 17:
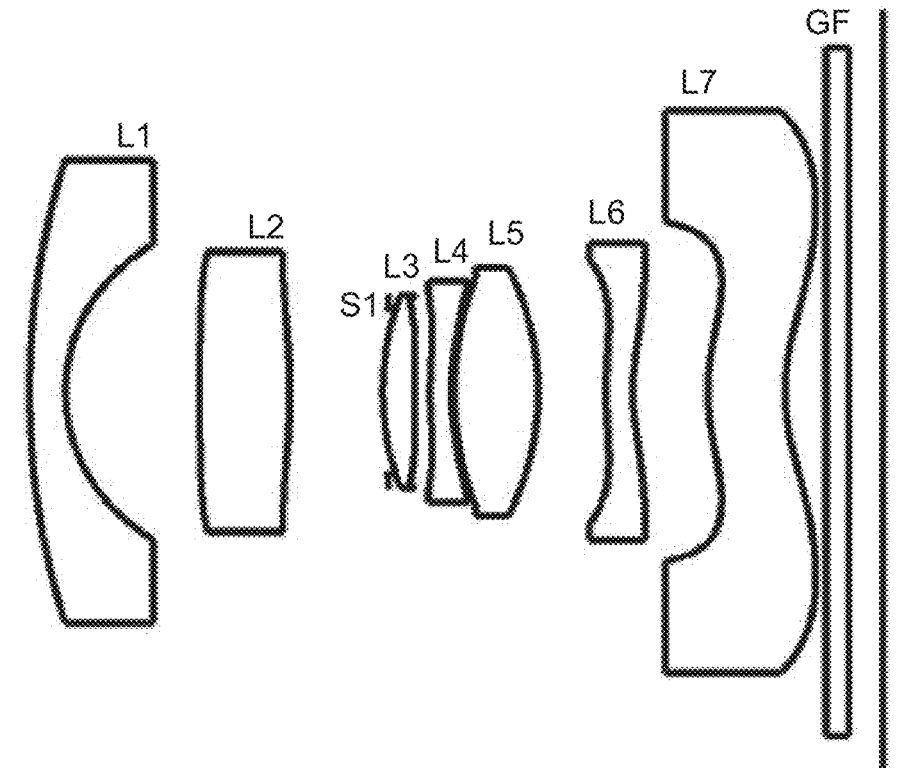

FIGS. 14 and 15 are schematic diagrams showing the axial aberration and magnification chromatic aberration of light with wavelengths of 650 nm, 610 nm, 555 nm, 510 nm, and 470 nm, respectively, after passing through the camera optical lens 40 according to the fourth embodiment. FIG. 16 is a schematic diagram showing the field curvature and distortion of light with a wavelength of 555 nm after passing through the camera optical lens 40 according to the fourth embodiment. The field curvature S of FIG. 16 is the field curvature in the arc-sagittal direction, and T is the field curvature in the meridional direction.

As shown in Table 29, the fourth embodiment satisfies each of the relationship expressions.

In this embodiment, the camera optical lens 40 has an Entrance Pupil Diameter (ENPD) of 0.968 mm, a full field-of-view image height (IH) of 3.711 mm, and a field of view (FOV) of 113.44° in the diagonal direction. The camera optical lens 40 has excellent optical performance, featuring a large aperture, ultra-thinness, a balance between wide-angle capability and compactness, low aberration, low chromatic aberration, and high resolution up to 5M. Additionally, it possesses a long back focal length for ease of assembly and is cost-effective.

Fifth Embodiment

The fifth embodiment is basically the same as the first embodiment, and the meaning of the symbols is the same as that of the first embodiment, and only the differences are listed below.

Tables 17 and 18 show the design data of the camera optical lens 50 according to the fifth embodiment of the present application.

TABLE 17

| | R | d | | nd | | vd |
|---|---|---|---|---|---|---|
| S1 | ∞ | d0 = | −3.390 | | | |
| R1 | 7.930 | d1 = | 0.335 | nd1 | 1.8040 | v1 46.57 |
| R2 | 1.668 | d2 = | 1.268 | | | |
| R3 | 67.557 | d3 = | 0.852 | nd2 | 1.6610 | v2 20.53 |
| R4 | −6.118 | d4 = | 0.874 | | | |
| R5 | 3.102 | d5 = | 0.304 | nd3 | 1.5370 | v3 55.98 |
| R6 | 1078.365 | d6 = | 0.141 | | | |
| R7 | 3.804 | d7 = | 0.200 | nd4 | 1.6610 | v4 20.53 |
| R8 | 2.279 | d8 = | 0.030 | | | |
| R9 | 3.223 | d9 = | 0.793 | nd5 | 1.5891 | v5 61.25 |
| R10 | −2.764 | d10 = | 0.638 | | | |
| R11 | 3.684 | d11 = | 0.250 | nd6 | 1.6610 | v6 20.53 |
| R12 | 2.008 | d12 = | 0.709 | | | |
| R13 | 1.988 | d13 = | 0.729 | nd7 | 1.5370 | v7 55.98 |
| R14 | 1.919 | d14 = | 0.392 | | | |
| R15 | ∞ | d15 = | 0.210 | ndg | 1.5168 | vg 64.17 |
| R16 | ∞ | d16 = | 0.323 | | | |

Table 18 illustrates the aspheric data of each lens in the camera optical lens 50 according to the fifth embodiment of the present application.

TABLE 18

| | Cone Coefficient | Aspheric Coefficient | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | −1.2284E+03 | 3.4364E−02 | 5.2645E−02 | −1.1205E−01 | 2.6794E−01 | −2.7182E−01 |
| R4 | 1.5792E+00 | 5.0775E−02 | −1.6210E−03 | 1.4714E−02 | 5.8044E−02 | −2.5380E−01 |
| R5 | 6.3378E+00 | 2.1235E−02 | −3.5060E−02 | 2.0460E−02 | −1.5151E−02 | −6.2489E−03 |
| R6 | 1.3668E+06 | −3.0737E−02 | −3.1591E−02 | −2.1601E−04 | 3.0871E−02 | −3.0013E−02 |
| R7 | −3.5131E+01 | −1.1412E−01 | −4.9658E−02 | 7.1099E−02 | −1.8405E−02 | −1.4795E−03 |
| R8 | −8.9452E+00 | −6.9561E−02 | −1.3333E−02 | 7.0668E−02 | 6.9463E−02 | −1.8626E−01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −2.9052E+01 | −8.1450E−01 | 1.9566E+00 | −4.5235E+00 | 4.4545E+00 | 1.7921E+00 |
| R12 | −1.9296E+01 | −7.5824E−01 | 1.6708E+00 | −3.6258E+00 | 2.0031E+00 | 6.8803E+00 |

TABLE 18-continued

| | | | | | |
|---|---|---|---|---|---|
| R13 | -1.0838E+01 | -5.2584E-01 | -1.2440E+01 | 4.5748E+01 | -8.2434E+01 | 1.1044E+01 |
| R14 | -3.1921E+00 | -4.8061E+00 | 8.9122E+00 | -6.6317E+00 | -4.7919E+00 | 6.9679E+00 |

| | Cone Coefficient | Aspheric Coefficient | | | | |
|---|---|---|---|---|---|---|
| | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | -1.2284E+03 | -4.7344E-02 | 2.2188E-01 | 4.2174E-02 | -2.0592E-01 | 8.3341E-02 |
| R4 | 1.5792E+00 | 2.7262E-01 | 5.9163E-02 | -3.1072E-01 | 2.1386E-01 | -4.7901E-02 |
| R5 | 6.3378E+00 | 9.9194E-03 | -3.9057E-03 | -7.8741E-03 | 8.7330E-03 | -8.5228E-04 |
| R6 | 1.3668E+06 | -9.6815E-03 | 2.5419E-02 | -9.5141E-04 | -4.9416E-03 | 2.0290E-03 |
| R7 | -3.5131E+01 | 2.9708E-02 | 3.8039E-03 | -2.0844E-02 | 5.2328E-03 | -1.4531E-03 |
| R8 | -8.9452E+00 | 1.3594E-01 | 6.7822E-02 | -1.8810E-01 | 1.1407E-01 | -2.3078E-02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | -2.9052E+01 | -7.2866E+00 | -1.5461E+00 | 1.6863E+01 | -1.5795E+01 | 4.2123E+00 |
| R12 | -1.9296E+01 | -1.2507E+01 | 8.6232E+00 | 1.7771E+00 | -7.4947E+00 | 2.5810E+00 |
| R13 | -1.0838E+01 | 7.0472E+01 | -2.0166E+01 | -1.7607E+01 | 4.0182E+02 | -1.8778E+03 |
| R14 | -3.1921E+00 | 4.8432E+00 | -1.1774E+01 | 9.6262E+00 | -6.4083E+00 | 2.3892E+00 |

Tables 19 and 20 show the design data of the inflection point and the stationary point of each lens in the camera optical lens 50 according to the fifth embodiment of the present application.

TABLE 19

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 0 | / | / |
| P2R2 | 1 | 0.705 | / |
| P3R1 | 0 | / | / |
| P3R2 | 2 | 0.045 | 0.875 |
| P4R1 | 2 | 0.325 | 0.855 |
| P4R2 | 0 | / | / |
| P5R1 | 0 | / | / |
| P5R2 | 0 | / | / |
| P6R1 | 1 | 0.345 | / |
| P6R2 | 2 | 0.535 | 1.265 |
| P7R1 | 1 | 0.595 | / |
| P7R2 | 1 | 0.805 | / |

TABLE 20

| | Number of Stationary Points | Position of Stationary Point 1 | Position of Stationary Point 2 |
|---|---|---|---|
| P1R1 | 0 | / | / |
| P1R2 | 0 | / | / |
| P2R1 | 0 | / | / |
| P2R2 | 1 | 1.165 | / |
| P3R1 | 0 | / | / |
| P3R2 | 1 | 0.075 | / |
| P4R1 | 1 | 0.575 | / |
| P4R2 | 0 | / | / |
| P5R1 | 0 | / | / |
| P5R2 | 0 | / | / |
| P6R1 | 1 | 0.655 | / |
| P6R2 | 2 | 1.215 | 1.305 |
| P7R1 | 1 | 1.065 | / |
| P7R2 | 1 | 1.805 | / |

Figures 18, 19:
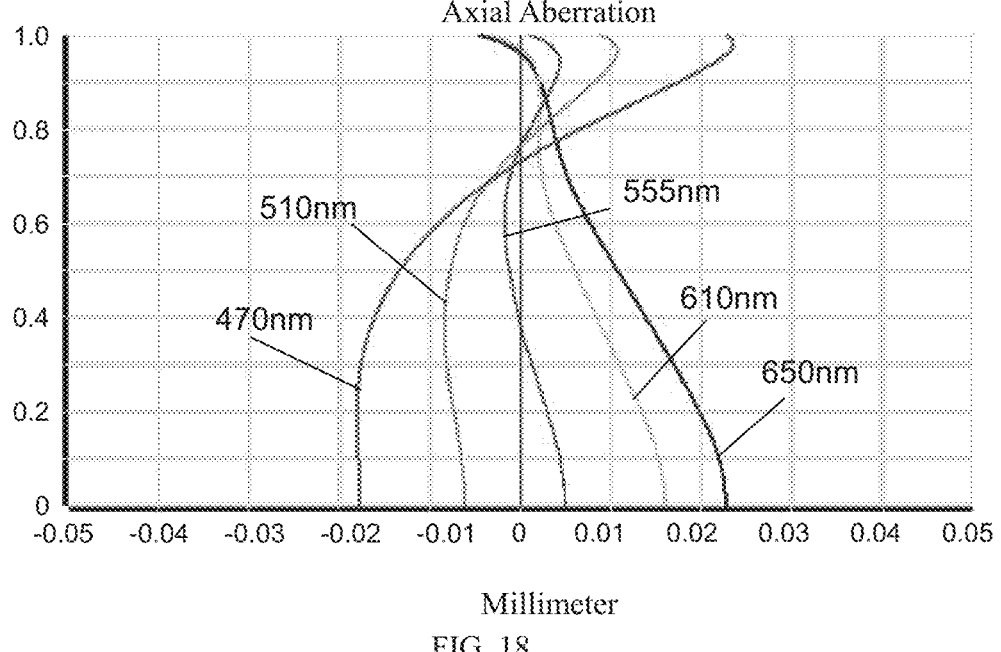
FIG. 18 is a schematic diagram showing the axial aberration of the camera optical lens shown in FIG. 17.
FIG. 19 is a schematic diagram showing the magnification chromatic aberration of the camera optical lens shown in FIG. 17.
Figure 20:
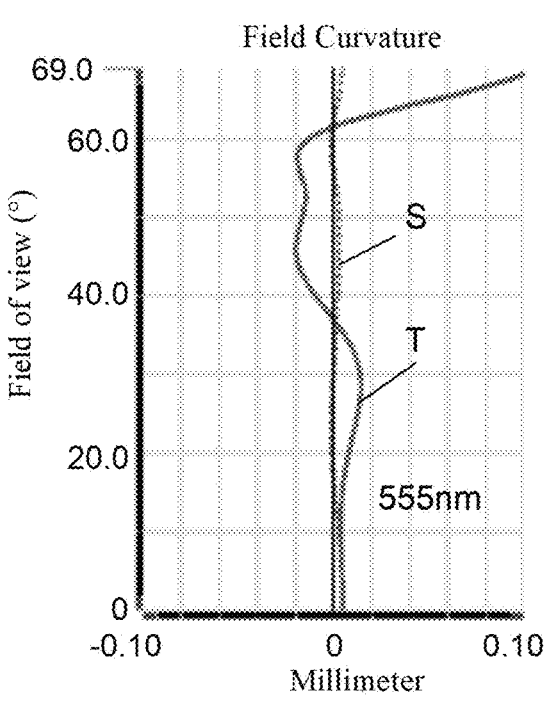
FIG. 20 is a schematic diagram showing the field curvature and distortion of the camera optical lens shown in FIG. 17.
Figure 20:
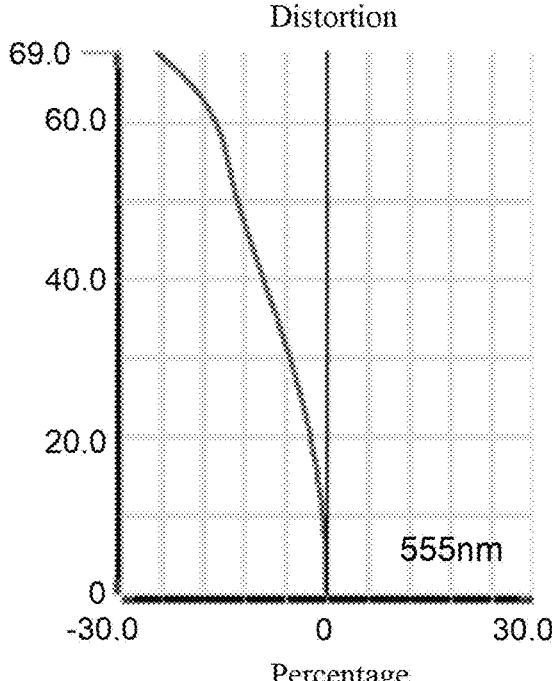
Figure 21:
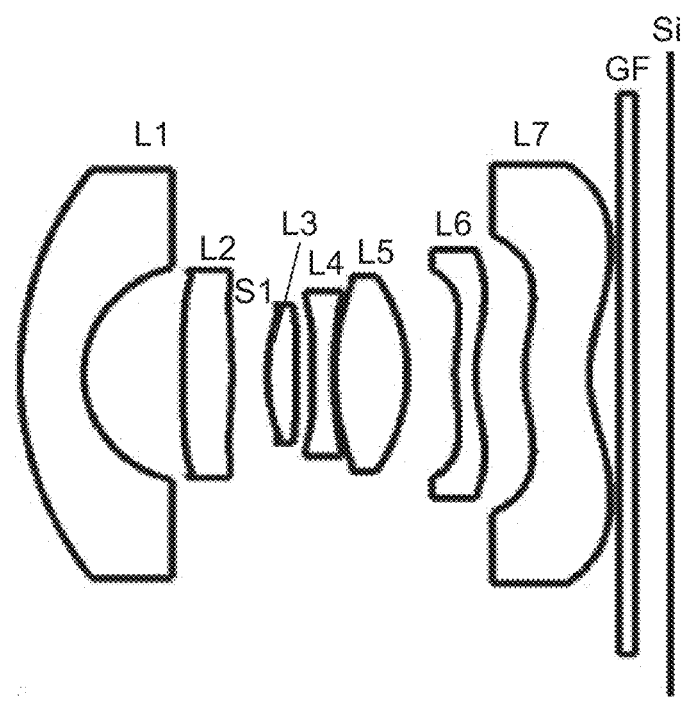
FIG. 21 is a structural schematic diagram of the camera optical lens according to the sixth embodiment of the present application.

FIGS. 18 and 19 are schematic diagrams showing the axial aberration and magnification chromatic aberration of light with wavelengths of 650 nm, 610 nm, 555 nm, 510 nm, and 470 nm, respectively, after passing through the camera optical lens 50 according to the fifth embodiment. FIG. 20 is a schematic diagram showing the field curvature and distortion of light with a wavelength of 555 nm after passing through the camera optical lens 50 according to the fifth embodiment. The field curvature S of FIG. 20 is the field curvature in the arc-sagittal direction, and T is the field curvature in the meridional direction.

As shown in Table 29, the fifth embodiment satisfies each of the relationship expressions.

In this embodiment, the camera optical lens 50 has an Entrance Pupil Diameter (ENPD) of 0.862 mm, a full field-of-view image height (IH) of 3.711 mm, and a field of view (FOV) of 138.02° in the diagonal direction. The camera optical lens 50 has excellent optical performance, featuring a large aperture, ultra-thinness, a balance between wide-angle capability and compactness, low aberration, low chromatic aberration, and high resolution up to 5M. Additionally, it possesses a long back focal length for ease of assembly and is cost-effective.

Sixth Embodiment

The sixth embodiment is basically the same as the first embodiment, and the meaning of the symbols is the same as that of the first embodiment, and only the differences are listed below.

In this embodiment, the image surface of the third lens L3 is convex at the proximal-axis position.

Tables 21 and 22 show the design data of the camera optical lens 60 according to the sixth embodiment of the present application.

TABLE 21

| | R | | d | | nd | | vd |
|---|---|---|---|---|---|---|---|
| S1 | ∞ | d0 = | -3.235 | | | | |
| R1 | 4.691 | d1 = | 0.801 | nd1 | 1.8040 | v1 | 46.57 |
| R2 | 1.487 | d2 = | 1.248 | | | | |
| R3 | 35.998 | d3 = | 0.616 | nd2 | 1.6610 | v2 | 20.53 |
| R4 | -6.365 | d4 = | 0.449 | | | | |
| R5 | 3.116 | d5 = | 0.355 | nd3 | 1.5370 | v3 | 55.98 |
| R6 | -2736.279 | d6 = | 0.203 | | | | |
| R7 | 10.135 | d7 = | 0.262 | nd4 | 1.6610 | v4 | 20.53 |
| R8 | 3.393 | d8 = | 0.030 | | | | |
| R9 | 3.728 | d9 = | 0.899 | nd5 | 1.5891 | v5 | 61.25 |
| R10 | -2.420 | d10 = | 0.607 | | | | |

TABLE 21-continued

|  | R | d |  | nd |  | vd |
|---|---|---|---|---|---|---|
| R11 | 3.091 | d11 = 0.250 | nd6 | 1.6610 | v6 | 20.53 |
| R12 | 1.944 | d12 = 0.620 |  |  |  |  |
| R13 | 2.212 | d13 = 0.814 | nd7 | 1.5370 | v7 | 55.98 |
| R14 | 1.972 | d14 = 0.370 |  |  |  |  |
| R15 | ∞ | d15 = 0.210 | ndg | 1.5168 | vg | 64.17 |
| R16 | ∞ | d16 = 0.441 |  |  |  |  |

Table 22 illustrates aspheric data of each lens in the camera optical lens 60 according to the sixth embodiment of the present application.

TABLE 22

|  | Cone Coefficient | Aspheric Coefficient |  |  |  |  |
|---|---|---|---|---|---|---|
|  | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 6.8749E+02 | 5.9550E−02 | 6.3619E−02 | −1.5146E−01 | 2.6534E−01 | −2.3566E−01 |
| R4 | −3.0536E+01 | 7.7384E−02 | −2.2851E−02 | 7.8908E−03 | 5.7424E−02 | −2.4117E−01 |
| R5 | 7.1388E+00 | 4.1244E−02 | −3.9383E−02 | 1.8816E−02 | −1.4481E−02 | −2.8829E−03 |
| R6 | 7.1680E+06 | −6.9794E−03 | −3.8806E−02 | −2.4348E−03 | 3.3667E−02 | −2.8075E−02 |
| R7 | −3.8647E+01 | −1.0838E−01 | −5.2286E−02 | 5.9747E−02 | −2.6639E−02 | −5.2271E−03 |
| R8 | −6.9271E+00 | −6.8907E−02 | −2.0126E−02 | 6.3127E−02 | 6.7557E−02 | −1.8570E−01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −7.1136E+00 | −8.7602E−01 | 1.9456E+00 | −4.5068E+00 | 4.5071E+00 | 1.7785E+00 |
| R12 | −1.3719E+01 | −8.8764E−01 | 1.6727E+00 | −3.5532E+00 | 1.7871E+00 | 6.3295E+00 |
| R13 | −9.4794E+00 | −1.8715E+00 | −6.6273E+00 | 3.6139E+01 | −7.9262E+01 | 4.9796E+01 |
| R14 | −2.3213E+00 | −5.7083E+00 | 9.9479E+00 | −6.6511E+00 | −6.6112E+00 | 8.2104E+00 |

|  | Cone Coefficient | Aspheric Coefficient |  |  |  |  |
|---|---|---|---|---|---|---|
|  | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 6.8749E+02 | −3.2549E−02 | 2.1446E−01 | 2.1242E−02 | −2.1353E−01 | 1.0062E−01 |
| R4 | −3.0536E+01 | 2.7837E−01 | 5.8088E−02 | −3.1577E−01 | 2.1158E−01 | −4.3442E−02 |
| R5 | 7.1388E+00 | 1.2343E−02 | −2.9374E−03 | −8.3010E−03 | 7.7529E−03 | −2.0579E−03 |
| R6 | 7.1680E+06 | −8.5807E−03 | 2.6330E−03 | −2.0332E−03 | −5.2140E−03 | 2.0529E−03 |
| R7 | −3.8647E+01 | 3.0690E−02 | 6.3801E−03 | −1.8538E−02 | 7.1177E−03 | −1.1487E−03 |
| R8 | −6.9271E+00 | 1.3758E−01 | 6.9622E−02 | −1.8634E−01 | 1.1460E−01 | −2.3352E−02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −7.1136E+00 | −7.4108E+00 | −1.7302E+00 | 1.6699E+01 | −1.5757E+01 | 4.7184E+00 |
| R12 | −1.3719E+01 | −1.2809E+01 | 8.8198E+00 | 2.1662E+00 | −6.6603E+00 | 2.7091E+00 |
| R13 | −9.4794E+00 | 6.5150E+01 | −7.8399E+01 | −8.3770E+01 | 1.1456E+02 | 5.2036E−01 |
| R14 | −2.3213E+00 | 6.6061E+00 | −1.2526E+01 | 8.0053E+00 | −7.6540E+00 | 4.3793E+00 |

Tables 23 and 24 show the design data of the inflection point and the stationary point of each lens in the camera optical lens 60 according to the sixth embodiment of the present application.

TABLE 23

|  | Number of Inflection Points | Position of Inflection Point 1 | Position of Inflection Point 2 |
|---|---|---|---|
| P1R1 | 2 | 1.035 | 1.225 |
| P1R2 | 1 | 0.995 | / |
| P2R1 | 2 | 0.115 | 1.135 |
| P2R2 | 1 | 0.725 | / |
| P3R1 | 2 | 0.595 | 1.055 |
| P3R2 | 0 | / | / |
| P4R1 | 2 | 0.765 | 1.235 |
| P4R2 | 0 | / | / |
| P5R1 | 2 | 0.925 | 1.515 |

TABLE 23-continued

|  | Number of Inflection Points | Position of Inflection Point 1 | Position of Inflection Point 2 |
|---|---|---|---|
| P5R2 | 2 | 0.965 | 1.665 |
| P6R1 | 2 | 0.685 | 1.635 |
| P6R2 | 3 | 0.695 | 1.625 |
| P7R1 | 2 | 0.235 | 1.515 |
| P7R2 | 2 | 0.535 | 2.715 |

TABLE 24

|  | Number of Stationary Points | Position of Stationary Point 1 |
|---|---|---|
| P1R1 | 0 | / |
| P1R2 | 0 | / |
| P2R1 | 0 | / |
| P2R2 | 1 | 0.965 |
| P3R1 | 0 | / |
| P3R2 | 0 | / |
| P4R1 | 1 | 0.405 |
| P4R2 | 0 | / |
| P5R1 | 0 | / |
| P5R2 | 0 | / |
| P6R1 | 1 | 0.755 |
| P6R2 | 1 | 1.085 |
| P7R1 | 1 | 1.035 |
| P7R2 | 1 | 1.695 |

Figure 22:
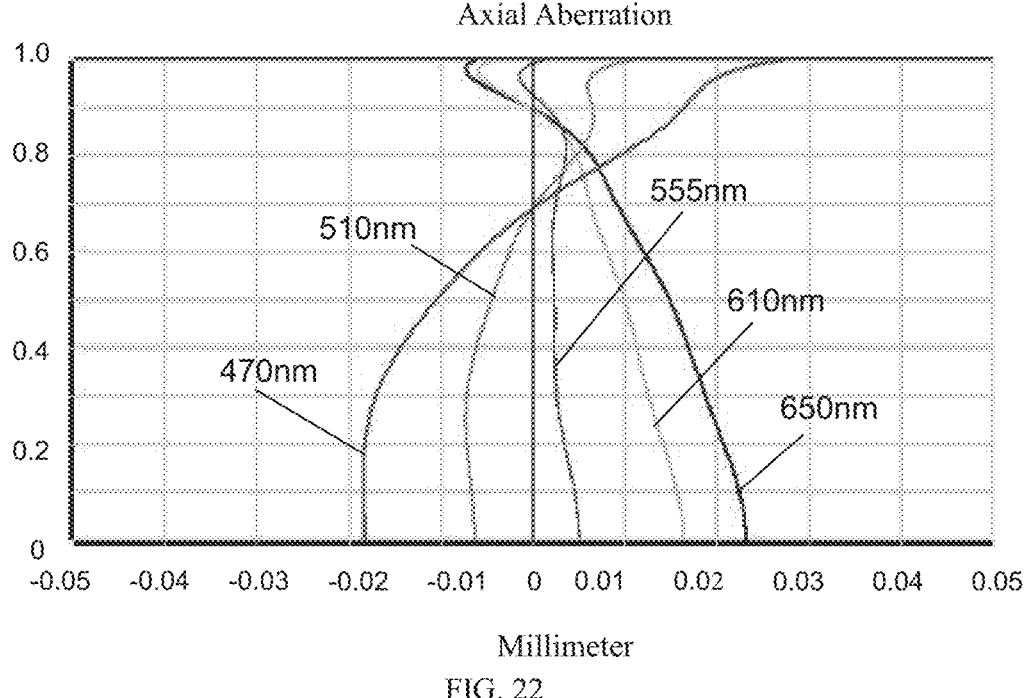
FIG. 22 is a schematic diagram showing the axial aberration of the camera optical lens shown in FIG. 21.
Figure 23:
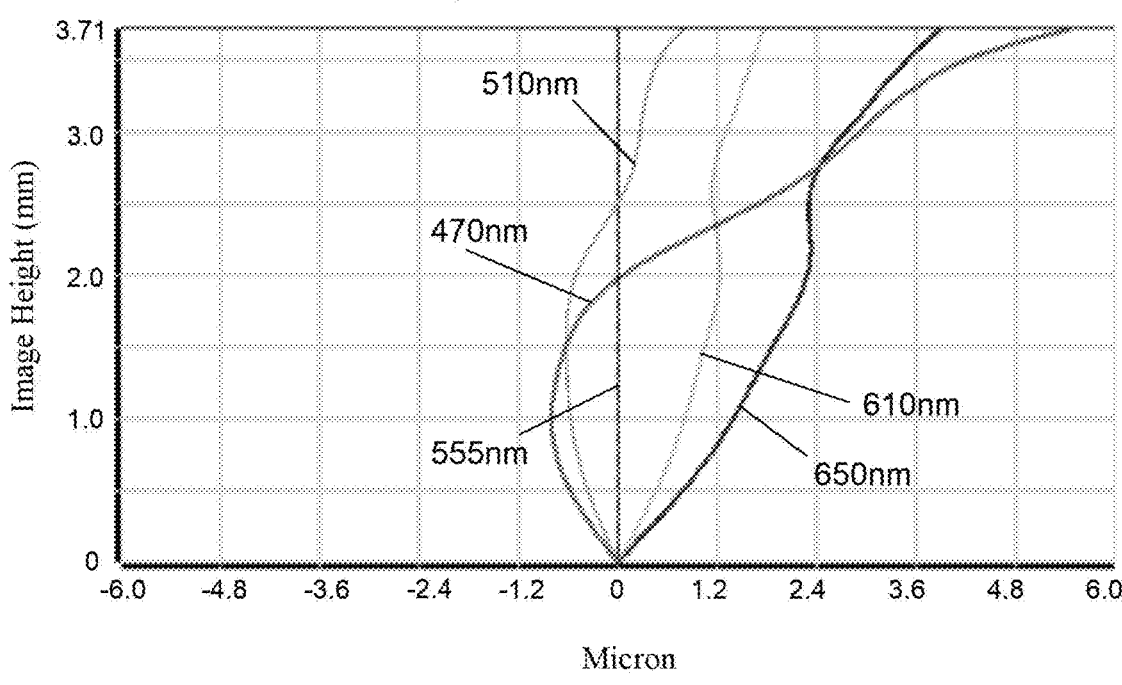
FIG. 23 is a schematic diagram showing the magnification chromatic aberration of the camera optical lens shown in FIG. 21.
Figures 24, 25:
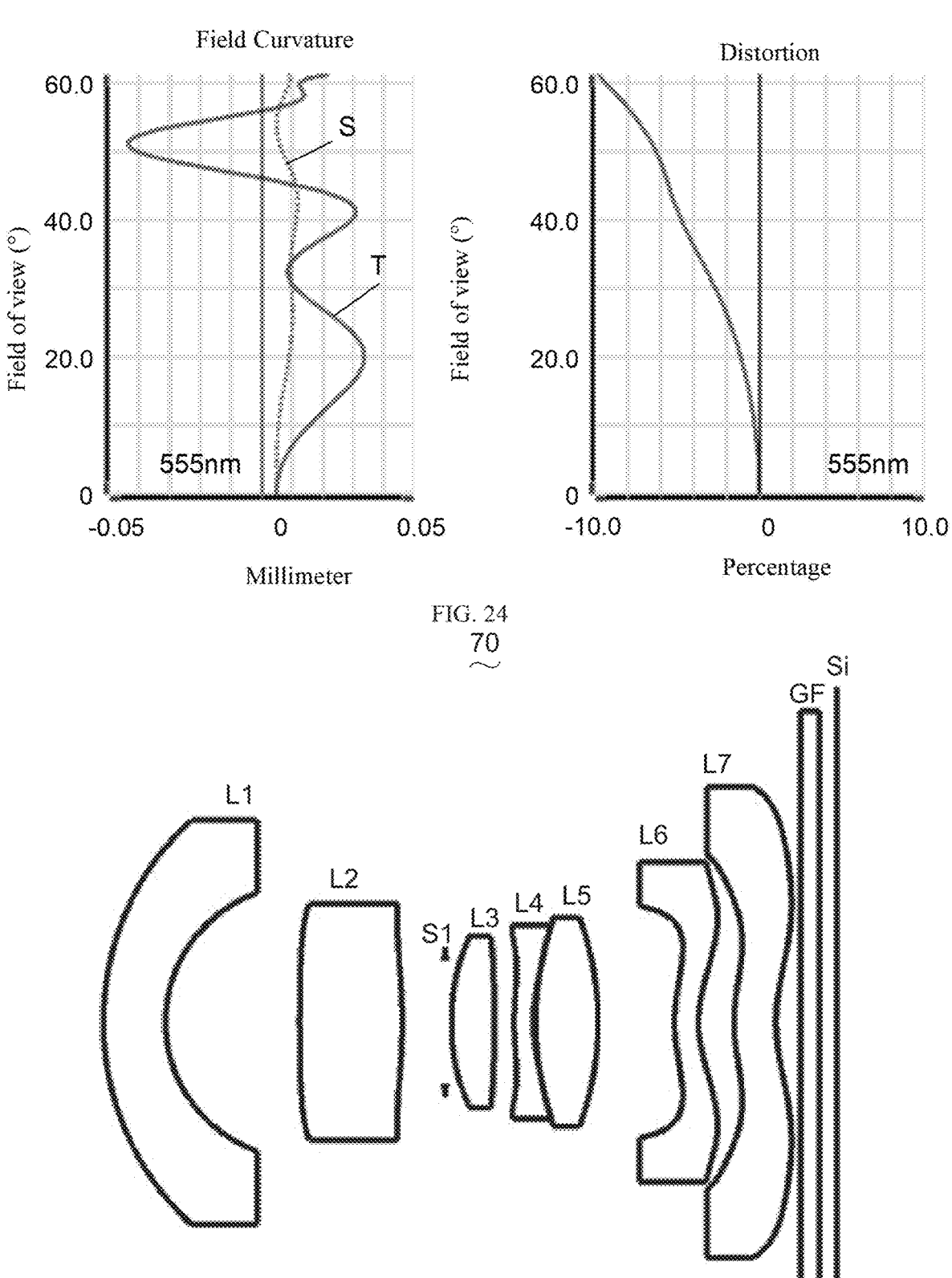
FIG. 24 is a schematic diagram showing the field curvature and distortion of the camera optical lens shown in FIG. 21.
FIG. 25 is a structural schematic diagram of the camera optical lens according to the first comparison example of the present application.

FIGS. 22 and 23 are schematic diagrams showing the axial aberration and magnification chromatic aberration of light with wavelengths of 650 nm, 610 nm, 555 nm, 510 nm, and 470 nm, respectively, after passing through the camera optical lens 60 according to the sixth embodiment. FIG. 24 is a schematic diagram showing the field curvature and distortion of light with a wavelength of 555 nm after passing through the camera optical lens 60 according to the sixth embodiment. The field curvature S of FIG. 24 is the field curvature in the arc-sagittal direction, and T is the field curvature in the meridional direction.

As shown in Table 29, the sixth embodiment satisfies each of the relationship expressions.

In this embodiment, the camera optical lens 60 has an Entrance Pupil Diameter (ENPD) of 1.025 mm, a full field-of-view image height (IH) of 3.711 mm, and a field of view (FOV) of 122.50° in the diagonal direction. The camera optical lens 60 has excellent optical performance, featuring a large aperture, ultra-thinness, a balance between wide-angle capability and compactness, low aberration, low chromatic aberration, and high resolution up to 5M. Additionally, it possesses a long back focal length for ease of assembly and is cost-effective.

First Comparison Example

The first comparison example is basically the same as the first embodiment, the meaning of the symbols is the same as that of the first embodiment, and only the differences are listed below.

In the first comparison example, the image surface of the third lens L3 is convex at the proximal-axis position.

Tables 25 and 26 show the design data of the camera optical lens 70 according to the first comparison example.

TABLE 25

|  | R | | d | | nd | | vd | |
|---|---|---|---|---|---|---|---|---|
| S1 | ∞ | d0 = | −3.797 | | | | | |
| R1 | 3.086 | d1 = | 0.695 | nd1 | 1.6610 | v1 | 20.53 | |
| R2 | 1.530 | d2 = | 1.486 | | | | | |
| R3 | 34.321 | d3 = | 1.142 | nd2 | 1.6610 | v2 | 20.53 | |
| R4 | −5.150 | d4 = | 0.548 | | | | | |
| R5 | 3.101 | d5 = | 0.466 | nd3 | 1.5370 | v3 | 55.98 | |
| R6 | −223.961 | d6 = | 0.225 | | | | | |
| R7 | 2.799 | d7 = | 0.211 | nd4 | 1.6610 | v4 | 20.53 | |
| R8 | 1.642 | d8 = | 0.030 | | | | | |
| R9 | 3.405 | d9 = | 0.688 | nd5 | 1.5891 | v5 | 61.25 | |
| R10 | −3.413 | d10 = | 0.854 | | | | | |
| R11 | 1.788 | d11 = | 0.264 | nd6 | 1.6610 | v6 | 20.53 | |
| R12 | 1.250 | d12 = | 0.394 | | | | | |
| R13 | 1.908 | d13 = | 0.463 | nd7 | 1.5370 | v7 | 55.98 | |
| R14 | 1.870 | d14 = | 0.273 | | | | | |
| R15 | ∞ | d15 = | 0.210 | ndg | 1.5168 | vg | 64.17 | |
| R16 | ∞ | d16 = | 0.200 | | | | | |

Table 26 illustrates the aspheric surface data for each lens in the camera optical lens 70 according to the first comparison example of the present application.

TABLE 26

| | Cone Coefficient | Aspheric Coefficient | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 5.3618E+02 | 4.9570E−02 | 6.2078E−02 | −1.3756E−01 | 2.7415E−01 | −2.4259E−01 |
| R4 | −2.8001E+01 | 6.0732E−02 | −2.7212E−02 | 2.3438E−02 | 6.7509E−02 | −2.4205E−01 |
| R5 | 7.1885E+00 | 4.2185E−02 | −3.8953E−02 | 1.9029E−02 | −1.4309E−02 | −2.7684E−03 |
| R6 | 4.8796E+04 | −5.8368E−03 | −3.5597E−02 | −5.2105E−04 | 3.4012E−02 | −2.8307E−02 |
| R7 | −4.6206E+01 | −1.0740E−01 | −5.2421E−02 | 5.9700E−02 | −2.6480E−02 | −5.0382E−03 |
| R8 | −9.1715E+00 | −7.0627E−02 | −1.9443E−02 | 6.3670E−02 | 6.7757E−02 | −1.8559E−01 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −3.6459E+00 | −9.8248E−01 | 1.7777E+00 | −4.4946E+00 | 4.3974E+00 | 1.5971E+00 |
| R12 | −4.9061E+00 | −1.1974E+00 | 1.6859E+00 | −3.4608E+00 | 1.8354E+00 | 6.3267E+00 |
| R13 | −7.2902E+00 | −4.3535E+00 | −3.2305E+00 | 3.8914E+01 | −8.0138E+01 | 5.0935E+01 |
| R14 | −5.5842E+00 | −6.1248E+00 | 1.0957E+00 | −4.3037E+00 | −8.8917E+00 | 5.9603E+00 |

| | Cone Coefficient | Aspheric Coefficient | | | | |
|---|---|---|---|---|---|---|
| | k | A14 | A16 | A18 | A20 | A22 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | 5.3618E+02 | −3.4254E−02 | 2.1206E−01 | 2.0949E−02 | −2.1121E−01 | 9.9097E−02 |
| R4 | −2.8001E+01 | 2.7143E−01 | 4.9301E−02 | −3.2304E−01 | 2.1099E−01 | −3.3288E−02 |
| R5 | 7.1885E+00 | 1.2260E−02 | −3.0881E−03 | −8.4825E−03 | 7.5055E−03 | −2.3766E−03 |
| R6 | 4.8796E+04 | −8.9766E−03 | 2.5960E−02 | −2.4468E−03 | −5.5099E−03 | 1.8040E−03 |
| R7 | −4.6206E+01 | 3.0819E−02 | 6.4148E−03 | −1.8676E−02 | 7.2008E−03 | −1.0983E−03 |
| R8 | −9.1715E+00 | 1.3781E−01 | 6.9854E−02 | −1.8609E−01 | 1.1481E−01 | −2.3205E−02 |
| R9 | 0.0000E+00 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 | 0.0000E+00 |
| R11 | −3.6459E+00 | −7.5430E+00 | −1.7470E+00 | 1.6701E+01 | −1.6001E+01 | 3.8173E+00 |
| R12 | −4.9061E+00 | −1.2827E+01 | 8.8080E+00 | 2.1647E+00 | −6.6562E+00 | 2.7256E+00 |
| R13 | −7.2902E+00 | 6.6817E+01 | −8.0084E+01 | −9.3312E+01 | 1.0996E+02 | −1.3566E+01 |
| R14 | −5.5842E+00 | 6.5100E+00 | −1.0492E+01 | 9.8915E+00 | −8.0966E+00 | 1.1039E+00 |

Tables 27 and 28 illustrate the design data of the inflection point and the stationary point of each lens in the camera optical lens 70 according to the first comparison example of the present application.

TABLE 27

|  | Number of Inflection Points | Position of Inflection Point 1 | Position of Inflection Point 2 |
|---|---|---|---|
| P1R1 | 0 | / | / |
| P1R2 | 0 | / | / |
| P2R1 | 0 | / | / |
| P2R2 | 1 | 0.615 | / |
| P3R1 | 0 | / | / |
| P3R2 | 1 | 0.855 | / |
| P4R1 | 2 | 0.325 | 0.895 |
| P4R2 | 2 | 0.625 | 0.705 |
| P5R1 | 0 | / | / |
| P5R2 | 0 | / | / |
| P6R1 | 1 | 0.475 | / |
| P6R2 | 2 | 0.585 | 1.575 |
| P7R1 | 1 | 0.475 | / |
| P7R2 | 1 | 0.635 | / |

TABLE 28

|  | Number of Stationary Points | Position of Stationary Point 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |

TABLE 28-continued

|  | Number of Stationary Points | Position of Stationary Point 1 |
|---|---|---|
| P4R1 | 1 | 0.585 |
| P4R2 | 0 | / |
| P5R1 | 0 | / |
| P5R2 | 0 | / |
| P6R1 | 1 | 0.825 |

TABLE 28-continued

|  | Number of Stationary Points | Position of Stationary Point 1 |
|---|---|---|
| P6R2 | 1 | 1.155 |
| P7R1 | 1 | 0.875 |
| P7R2 | 1 | 1.335 |

Figure 26:
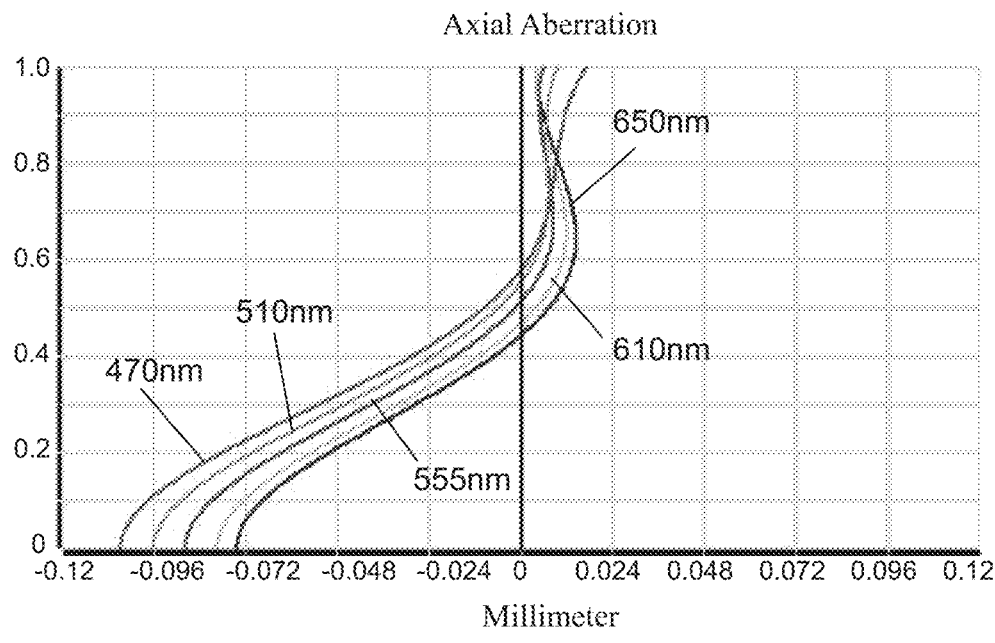
FIG. 26 is a schematic diagram showing the axial aberration of the camera optical lens shown in FIG. 25.
Figure 27:
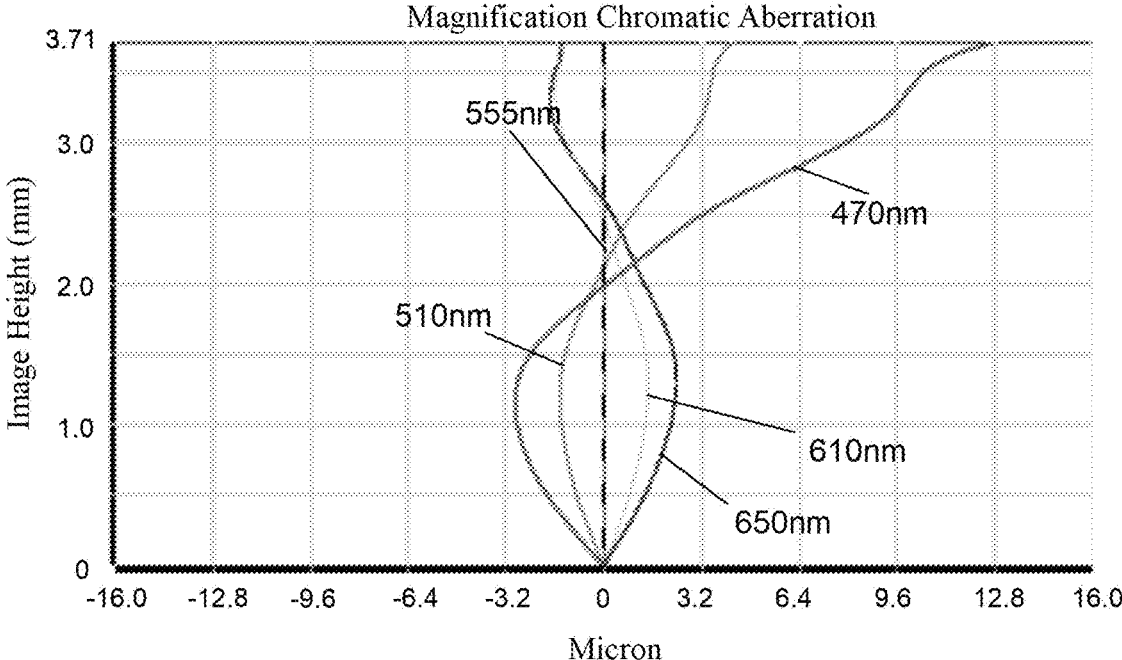
FIG. 27 is a schematic diagram showing the magnification chromatic aberration of the camera optical lens shown in FIG. 25.
Figure 28:
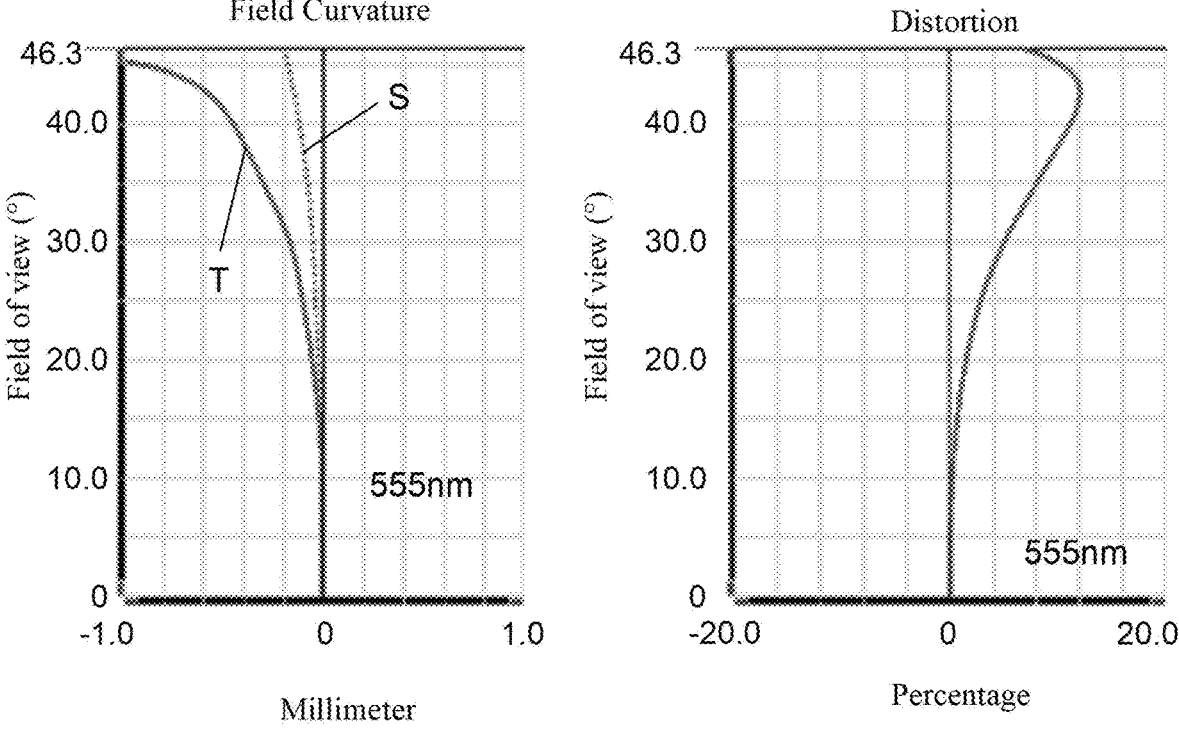
FIG. 28 is a schematic diagram showing the field curvature and distortion of the camera optical lens shown in FIG. 25.

FIGS. 26 and 27 are schematic diagrams showing the axial aberration and magnification chromatic aberration of light with wavelengths of 650 nm, 610 nm, 555 nm, 510 nm, and 470 nm, respectively, after passing through the camera optical lens 70 of the camera optical lens 70 according to the first comparison example. FIG. 28 is a schematic diagram showing the field curvature and distortion of the light having a wavelength of 555 nm after passing through the camera optical lens 70 according to the first comparison example. The field curvature S of FIG. 28 is the field curvature in the arc-sagittal direction, and the field curvature T is the field curvature in the meridional direction.

As shown in Table 29, the values corresponding to each of the relationship expressions in the first comparison example are listed in accordance with the above relationship expressions. Obviously, the camera optical lens 70 of the first comparison example does not satisfy the relationship expression: $1.70 \leq n1 \leq 2.20$.

In the first comparison example, the camera optical lens 70 has an Entrance Pupil Diameter (ENPD) of 1.078 mm, a full field-of-view image height (IH) of 3.711 mm, and a field of view (FOV) of 87.73° in the diagonal direction. The aberration of the camera optical lens 70 is not sufficiently compensated for, which hinders reducing the front aperture and results in suboptimal optical performance.

TABLE 29

| Parameters and relationship expressions | First Embodiment | Second Embodiment | Third Embodiment | Fourth Embodiment | Fifth Embodiment | Sixth Embodiment | Comparison Example |
|---|---|---|---|---|---|---|---|
| n1 | 1.804 | 1.804 | 1.700 | 2.101 | 1.804 | 1.804 | 1.661 |
| f5/f | 1.101 | 0.812 | 0.862 | 2.811 | 1.397 | 1.164 | 1.264 |
| d3/d5 | 1.402 | 0.980 | 0.710 | 2.499 | 2.800 | 1.738 | 2.450 |
| (R7 + R8)/(R7 − R8) | 2.892 | 2.692 | 2.931 | 2.811 | 3.989 | 2.007 | 3.840 |
| d12/d11 | 2.610 | 1.340 | 1.398 | 4.990 | 2.835 | 2.476 | 1.496 |
| f7/f | 41.053 | 78.108 | 48.997 | 79.953 | 20.006 | 80.000 | 22.502 |
| f | 2.360 | 3.030 | 2.733 | 2.130 | 1.896 | 2.256 | 2.371 |
| f1 | −3.006 | −4.713 | −4.120 | −2.769 | −2.680 | −3.037 | −5.540 |
| f2 | 8.254 | 13.678 | 12.900 | 9.454 | 8.453 | 8.159 | 6.795 |
| f3 | 5.820 | 5.831 | 5.821 | 5.807 | 5.774 | 5.778 | 5.683 |
| f4 | −8.043 | −7.584 | −7.480 | −6.681 | −8.998 | −7.772 | −6.429 |
| f5 | 2.645 | 2.460 | 2.356 | 2.432 | 2.648 | 2.626 | 2.997 |
| f6 | −8.340 | −6.457 | −6.735 | −8.901 | −7.041 | −8.608 | −7.752 |
| f7 | 98.665 | 236.630 | 133.899 | 170.297 | 37.923 | 180.479 | 53.356 |
| f12 | −6.224 | −7.448 | −6.550 | −4.986 | −5.547 | −6.538 | 112.727 |
| Fno | 2.20 | 2.20 | 2.20 | 2.20 | 2.20 | 2.20 | 2.20 |
| TTL | 8.001 | 7.350 | 7.003 | 8.205 | 8.048 | 8.175 | 8.149 |
| IH | 3.711 | 3.711 | 3.711 | 3.711 | 3.711 | 3.711 | 3.711 |
| FOV | 133.58° | 93.42° | 98.48° | 113.44° | 138.02° | 122.50° | 87.73° |

FOV: field of view in the diagonal direction of the camera optical lens 70.

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A camera optical lens, comprising, in order from an objective side to an image side:

a first lens having a negative refractive force;

a second lens having a positive refractive force;

a third lens having a positive refractive force;

a fourth lens having a negative refractive force;

a fifth lens having a positive refractive force;

a sixth lens having a negative refractive force; and a seventh lens having a positive refractive force;

wherein it is defined that a refractive index of the first lens n1, a focal length of the fifth lens is f5, a focal length of the camera optical lens is f, an on-axis thickness of the second lens is d3, and an on-axis thickness of the third lens is d5; and the following relationship expressions are satisfied:

$$1.70 \leq n1 \leq 2.20;$$

$$0.80 \leq f5/f \leq 1.40;$$

$$0.70 \leq d3/d5 \leq 2.80.$$

2. The camera optical lens of claim 1, wherein a central radius of curvature of an objective surface of the fourth lens is R7; a central radius of curvature of an image surface of the fourth lens is R8, and the following relationship expression is satisfied:

$$2.00 \leq (R7 + R8)/(R7 - R8) \leq 4.00.$$

3. The camera optical lens of claim 1, wherein an on-axis distance from an image surface of the sixth lens to an objective surface of the seventh lens is d12; an on-axis thickness of the sixth lens is d11, and the following relationship expression is satisfied:

$$1.30 \leq d12/d11 \leq 5.00.$$

4. The camera optical lens of claim 1, wherein a focal length of the seventh lens is f7, and the following relationship expression is satisfied:

$$20.00 \leq f7/f \leq 80.00.$$

5. The camera optical lens of claim 1, wherein an objective surface of the first lens is convex at a proximal-axis position, and an image surface of the first lens is concave at a proximal-axis position;

a focal length of the first lens is f1; a central radius of curvature of the objective surface of the first lens is R1; a central radius of curvature of the image surface of the first lens is R2; an on-axis thickness of the first lens is d1; a total track length of the camera optical lens is TTL, and the following relationship expressions are satisfied:

$$-3.11 \leq f1/f \leq -0.85;$$

$$0.77 \leq (R1 + R2)/(R1 - R2) \leq 4.36;$$

$$0.02 \leq d1/TTL \leq 0.20.$$

6. The camera optical lens of claim 1, wherein an image surface of the second lens is convex at a proximal-axis position;

a focal length of the second lens is f2; a central radius of curvature of an objective surface of the second lens is R3; a central radius of curvature of the image surface of the second lens is R4; a total track length of the camera optical lens is TTL, and the following relationship expressions are satisfied:

$$1.75 \leq f2/f \leq 7.08;$$

$$0.35 \leq (R3 + R4)/(R3 - R4) \leq 1.85;$$

$$0.02 \leq d3/TTL \leq 0.17.$$

7. The camera optical lens of claim 1, wherein an objective surface of the third lens is convex at a proximal-axis position;

a focal length of the third lens is f3; a central radius of curvature of the objective surface of the third lens is R5; a central radius of curvature of an image surface of the third lens is R6; a total track length of the camera optical lens is TTL, and the following relationship expressions are satisfied:

$$0.96 \leq f3/f \leq 4.57;$$

$$-2.07 \leq (R5 + R6)/(R5 - R6) \leq -0.67;$$

$$0.02 \leq d5/TTL \leq 0.08.$$

8. The camera optical lens of claim 1, wherein an objective surface of the fourth lens is convex at a proximal-axis position and an image surface of the fourth lens is concave at a proximal-axis position;

a focal length of the fourth lens is f4; an on-axis thickness of the fourth lens is d7; a total track length of the camera optical lens is TTL, and the following relationship expressions are satisfied:

$$-9.49 \leq f4/f \leq -1.67;$$

$$0.01 \leq d7/TTL \leq 0.05.$$

9. The camera optical lens of claim 1, wherein an objective surface of the fifth lens is convex at a proximal-axis position, and an image surface of the fifth lens is convex at a proximal-axis position;

a central radius of curvature of the objective surface of the fifth lens is R9; a central radius of curvature of the image surface of the fifth lens is R10; an on-axis thickness of the fifth lens is d9; a total track length of the camera optical lens is TTL, and the following relationship expressions are satisfied:

$$0.04 \le (R9 + R10)/(R9 - R10) \le 0.40;$$

$$0.04 \le d9/TTL \le 0.19.$$

10. The camera optical lens of claim 1, wherein an objective surface of the sixth lens is convex at a proximal-axis position, and an image surface of the sixth lens is concave at a proximal-axis position;

a focal length of the sixth lens is f6; a central radius of curvature of the objective surface of the sixth lens is R11; a central radius of curvature of the image surface of the sixth lens is R12; an on-axis thickness of the sixth lens is d11; a total track length of the camera optical lens is TTL, and the following relationship expressions are satisfied:

$$-8.36 \le f6/f \le -1.42;$$

$$1.29 \le (R11 + R12)/(R11 - R12) \le 8.65;$$

$$0.01 \le d11/TTL \le 0.06.$$

11. The camera optical lens of claim 1, wherein an objective surface of the seventh lens is convex at a proximal-axis position, and an image surface of the seventh lens is concave at a proximal-axis position;

a central radius of curvature of the objective surface of the seventh lens is R13; a central radius of curvature of the image surface of the seventh lens is R14; an on-axis thickness of the seventh lens is d13; a total track length of the camera optical lens is TTL and the following relationship expressions are satisfied:

$$7.44 \le (R13 + R14)/(R13 - R14) \le 84.93;$$

$$0.04 \le d13/TTL \le 0.21.$$

12. The camera optical lens of claim 1, wherein an aperture value FNO of the camera optical lens is less than or equal to 2.27.

13. The camera optical lens of claim 1, wherein a field of view (FOV) of the camera optical lens is greater than or equal to 93°.

14. The camera optical lens of claim 1, wherein the first lens is made of glass material.

15. The camera optical lens of claim 1, wherein the fifth lens is made of glass material.

\* \* \* \* \*